(12) United States Patent
Komiyama

(10) Patent No.: US 11,782,252 B2
(45) Date of Patent: Oct. 10, 2023

(54) OPTICAL SYSTEM AND IMAGE CAPTURING APPARATUS INCLUDING THE SAME

(71) Applicant: CANON KABUSHIKI KAISHA, Tokyo (JP)

(72) Inventor: Takahiro Komiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 17/336,934

(22) Filed: Jun. 2, 2021

(65) Prior Publication Data

US 2021/0382283 A1 Dec. 9, 2021

(30) Foreign Application Priority Data

Jun. 8, 2020 (JP) ................. 2020-099057

(51) Int. Cl.
  *G02B 15/14* (2006.01)
  *G02B 7/10* (2021.01)
  *G02B 15/20* (2006.01)

(52) U.S. Cl.
  CPC ........... *G02B 15/1461* (2019.08); *G02B 7/10* (2013.01); *G02B 15/20* (2013.01)

(58) Field of Classification Search
  CPC ...... G02B 15/1461; G02B 7/10; G02B 15/20; G02B 15/145505
  See application file for complete search history.

(56) References Cited

U.S. PATENT DOCUMENTS

| | | | |
|---|---|---|---|
| 2015/0177498 A1* | 6/2015 | Iwasawa | ............... H04N 23/69 348/240.3 |
| 2015/0205080 A1 | 7/2015 | Yokoyama | |
| 2020/0174234 A1 | 6/2020 | Katayose | |

* cited by examiner

*Primary Examiner* — James C. Jones
(74) *Attorney, Agent, or Firm* — CANON U.S.A., INC. IP Division

(57) ABSTRACT

An optical system includes a front lens unit, a first focusing unit having a negative refractive power, and a second focusing unit having a negative refractive power in this order from an object side to an image side. The optical system is a single focus optical system. When a focus is shifted from an object at infinity to an object at a short distance, the first focusing unit and the second focusing unit move to change a distance between the first focusing unit and the second focusing unit on an optical axis.

18 Claims, 18 Drawing Sheets

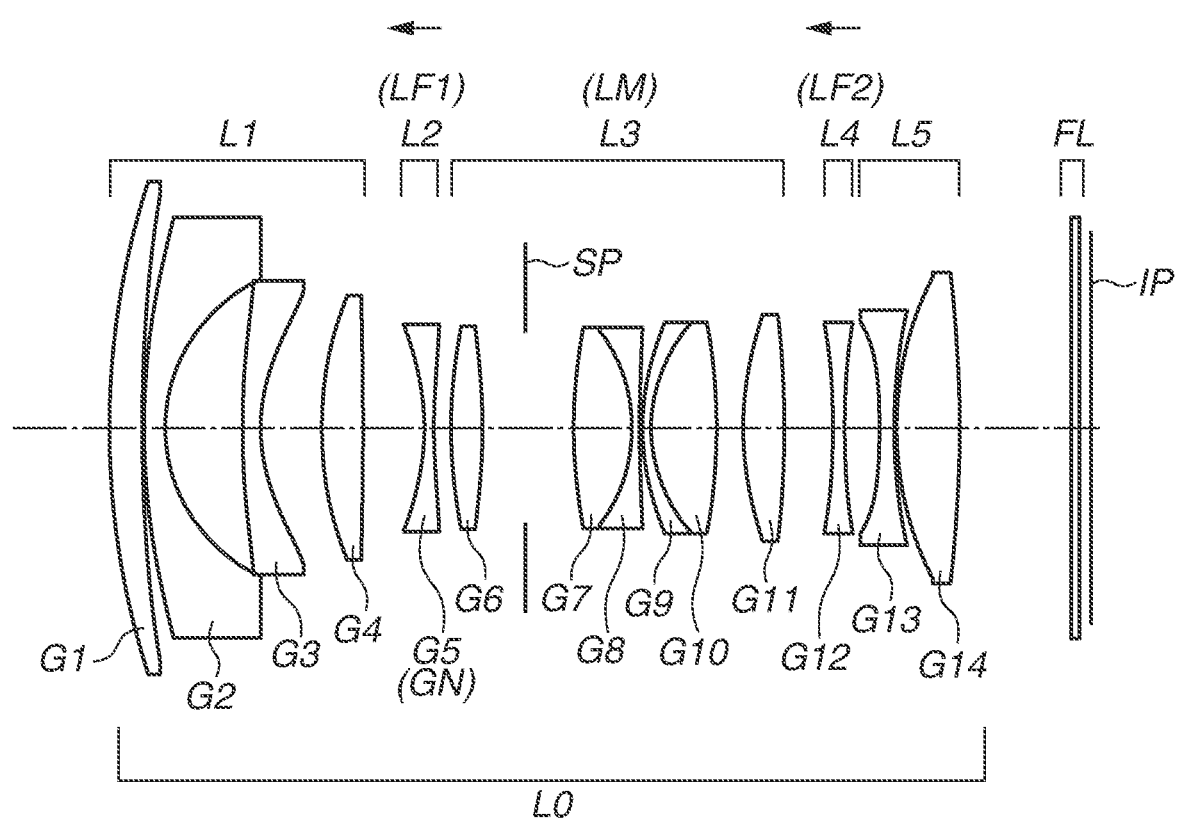

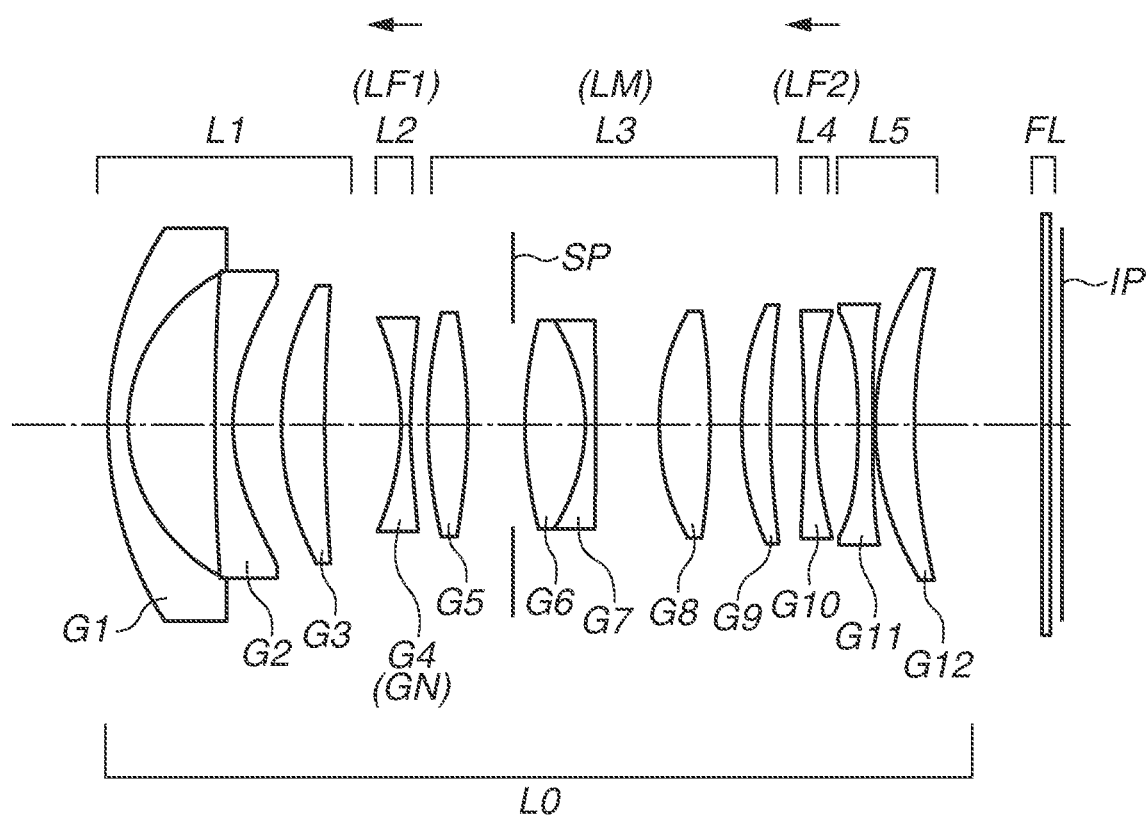

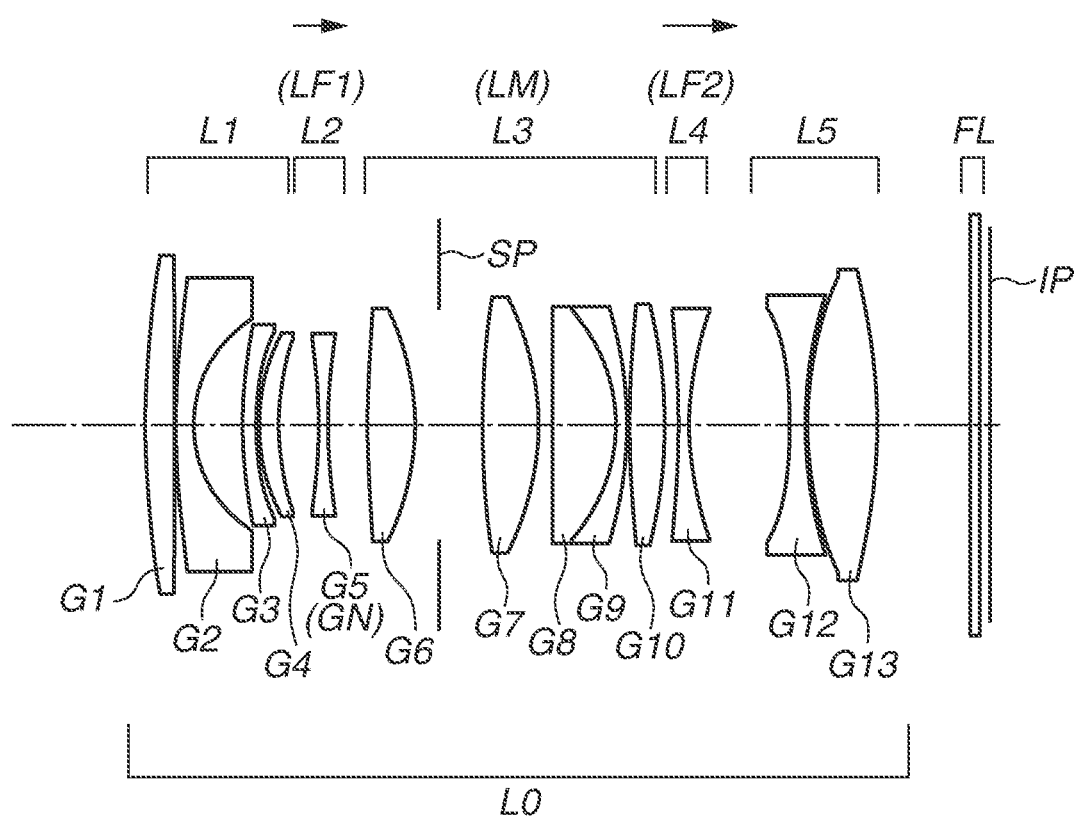

OPTICAL SYSTEM AND IMAGE CAPTURING APPARATUS INCLUDING THE SAME

BACKGROUND OF THE DISCLOSURE

Field of the Disclosure

The aspect of the embodiments relates to an optical system for use in image capturing apparatuses, such as digital video cameras, digital still cameras, broadcasting cameras, silver-halide film cameras, monitoring cameras, and in-vehicle cameras.

Description of the Related Art

An optical system for use in an image capturing apparatus such as a digital camera using a solid-state image sensor is demanded to perform auto-focusing quietly but at high speed. To achieve this, it is effective to reduce the weight of a focusing unit that moves from an infinite distance to a short distance in focusing.

Furthermore, aberration variations in focusing are also required to be small.

United States Patent Application Publication No. 2015/0205080 discusses an optical system using two lens units having negative refractive power as a focusing unit. According to United States Patent Application Publication No. 2015/0205080, the technique discussed therein realizes prompt focusing with ease and high optical performance across an entire object length.

SUMMARY OF THE DISCLOSURE

An optical system includes a front lens unit, a first focusing unit having a negative refractive power, and a second focusing unit having a negative refractive power in this order from an object side to an image side. The optical system is a single focus optical system. When a focus is shifted from an object at infinity to an object at a short distance, the first focusing unit and the second focusing unit move to change a distance between the first focusing unit and the second focusing unit on an optical axis. The following inequalities are satisfied: $0.00<|fF1|/|f1|<0.77$, $-0.76<sk/fF1<0.00$, and $0.10<fF1/fF2<1.90$, where fF1 is a focal length of the first focusing unit, fF2 is a focal length of the second focusing unit, f1 is a focal length of the front lens unit, and sk is a back focus of the optical system.

Further features of the disclosure will become apparent from the following description of exemplary embodiments with reference to the attached drawings.

BRIEF DESCRIPTION OF THE DRAWINGS

FIG. 1 is a cross-sectional view illustrating an optical system according to a first exemplary embodiment.

FIG. 3 is a cross-sectional view illustrating an optical system according to a second exemplary embodiment.

FIG. 15 is a cross-sectional view illustrating an optical system according to an eighth exemplary embodiment.

DESCRIPTION OF THE EMBODIMENTS

Figure 2A:
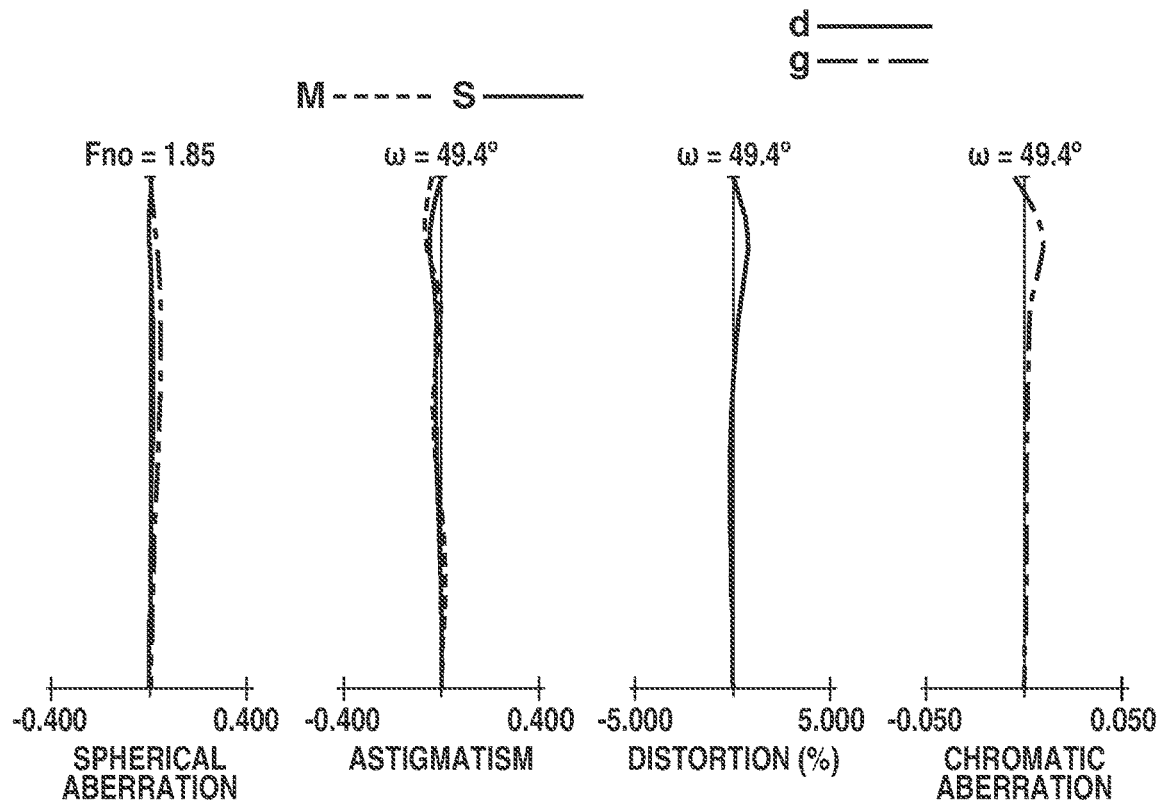
FIGS. 2A and 2B are aberration diagrams illustrating an optical system according to the first exemplary embodiment.
Figure 2B:
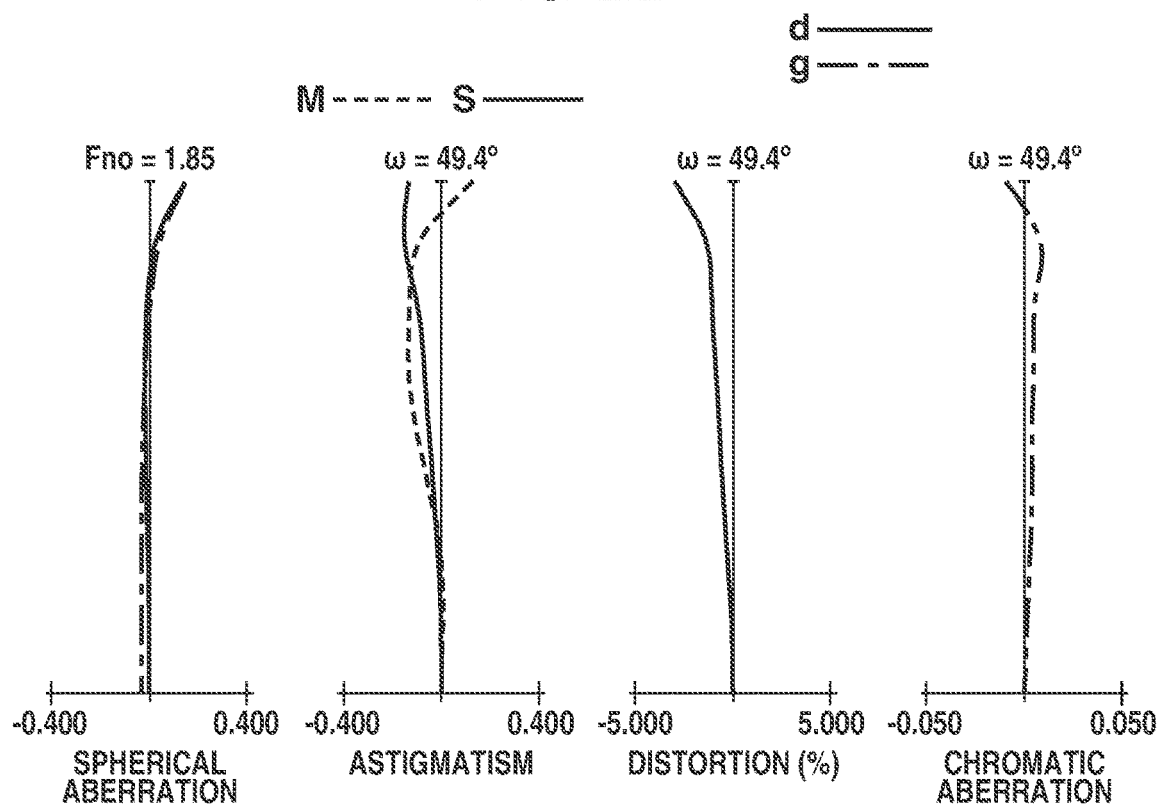
Figure 4A:
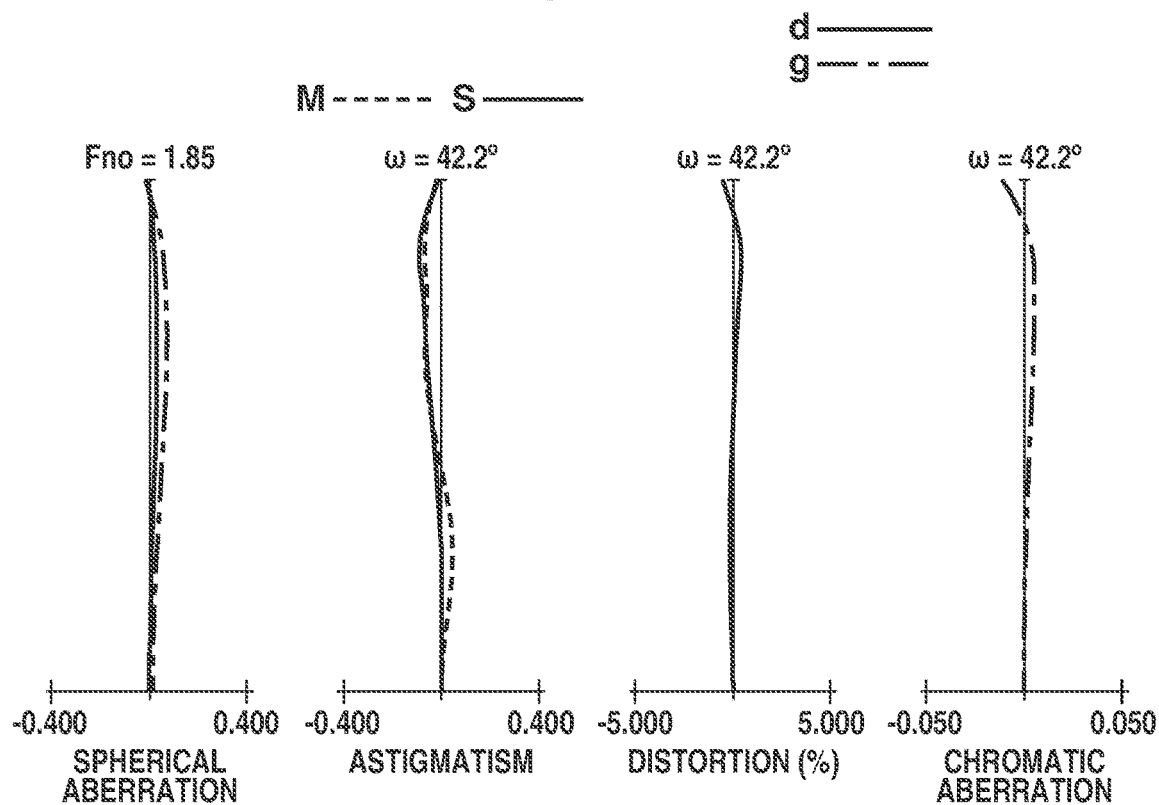
FIGS. 4A and 4B are aberration diagrams illustrating an optical system according to the second exemplary embodiment.
Figure 4B:
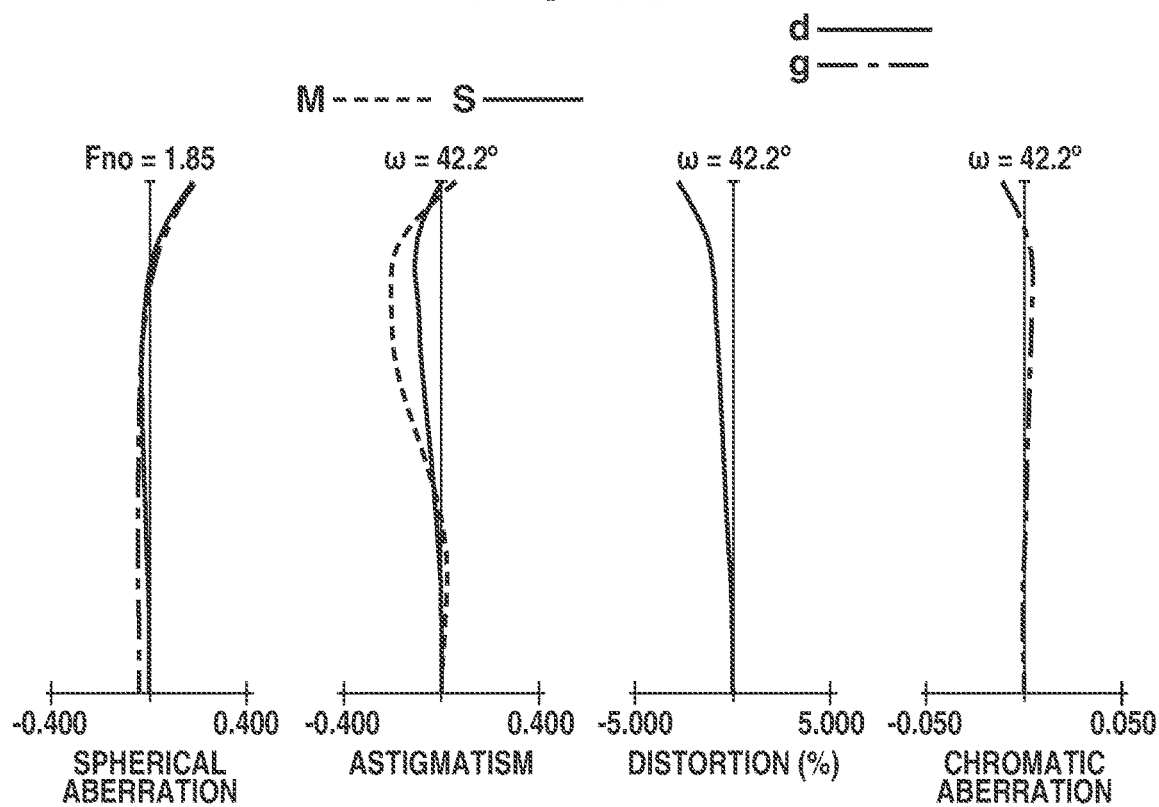
Figure 5:
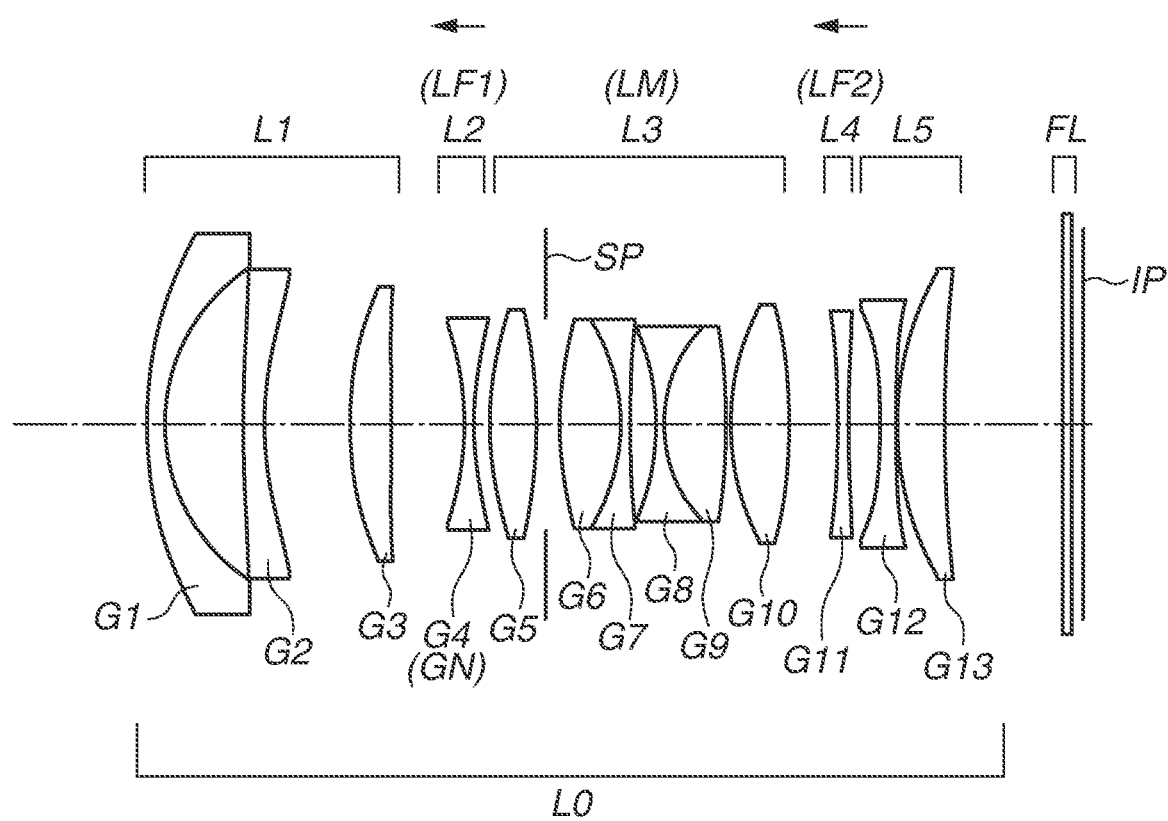
FIG. 5 is a cross-sectional view illustrating an optical system according to a third exemplary embodiment.
Figure 6A:
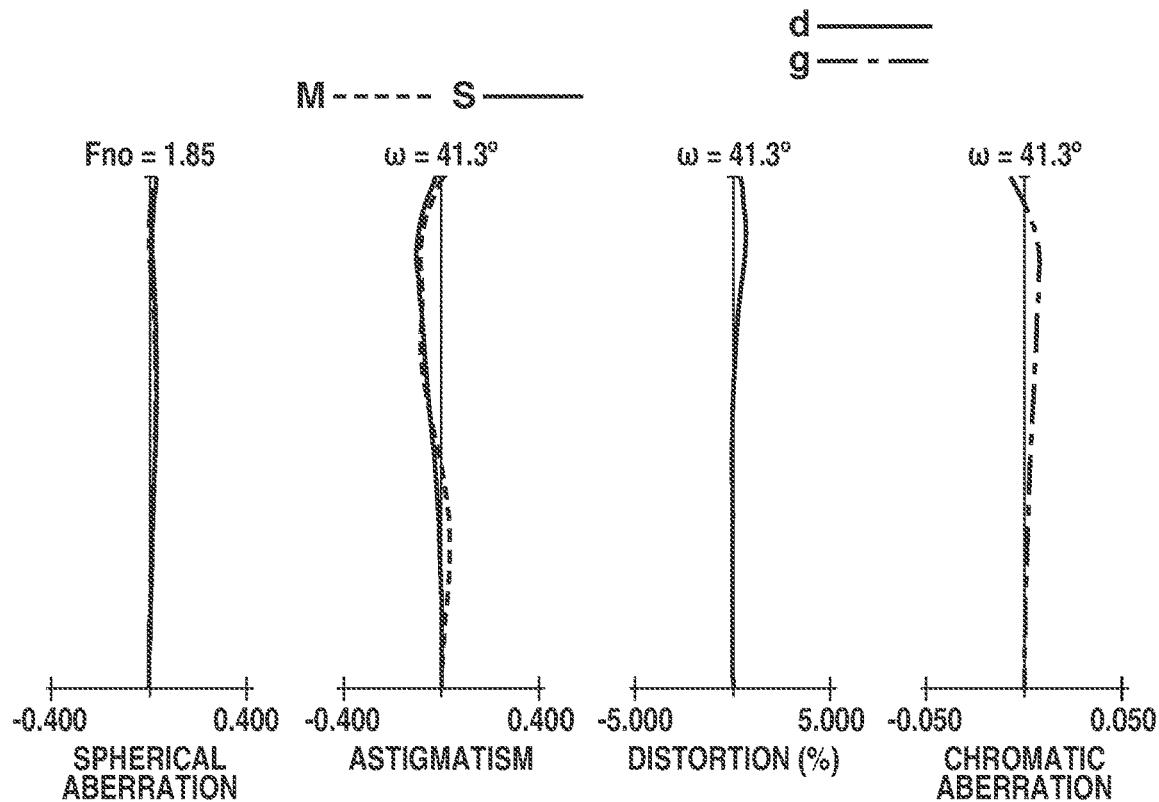
FIGS. 6A and 6B are aberration diagrams illustrating an optical system according to the third exemplary embodiment.
Figure 6B:
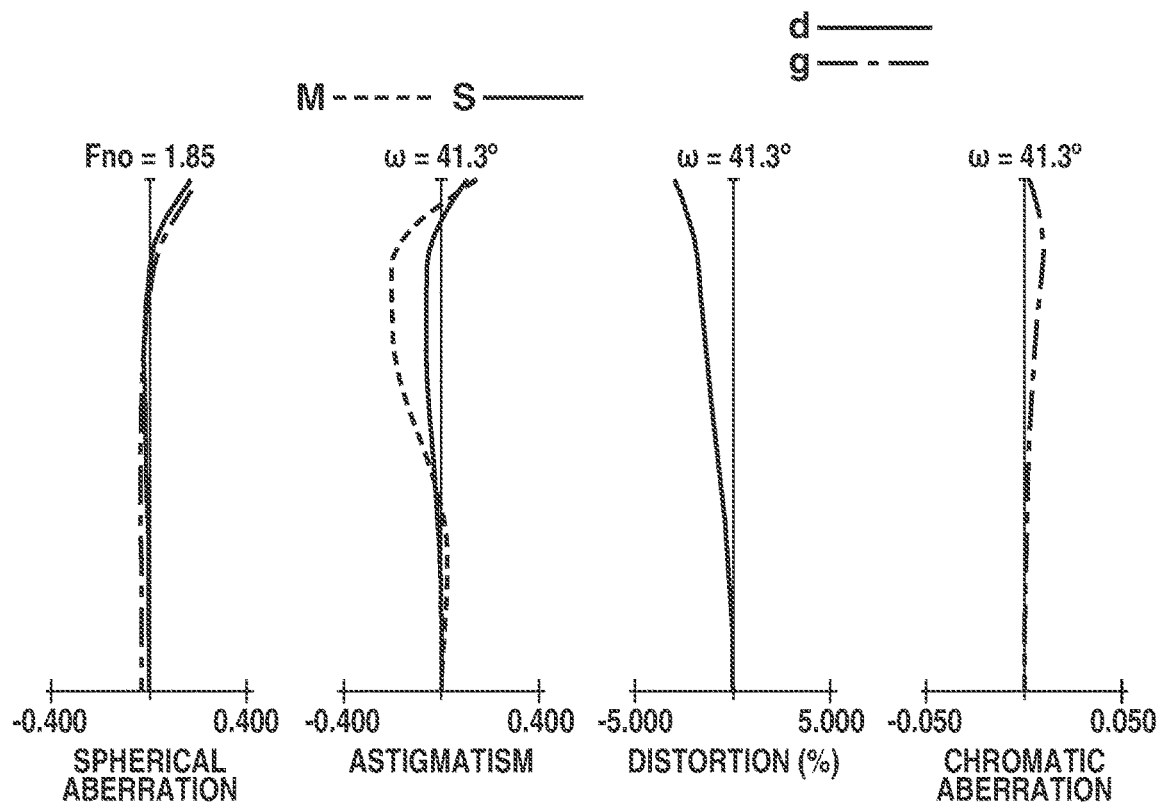
Figure 7:
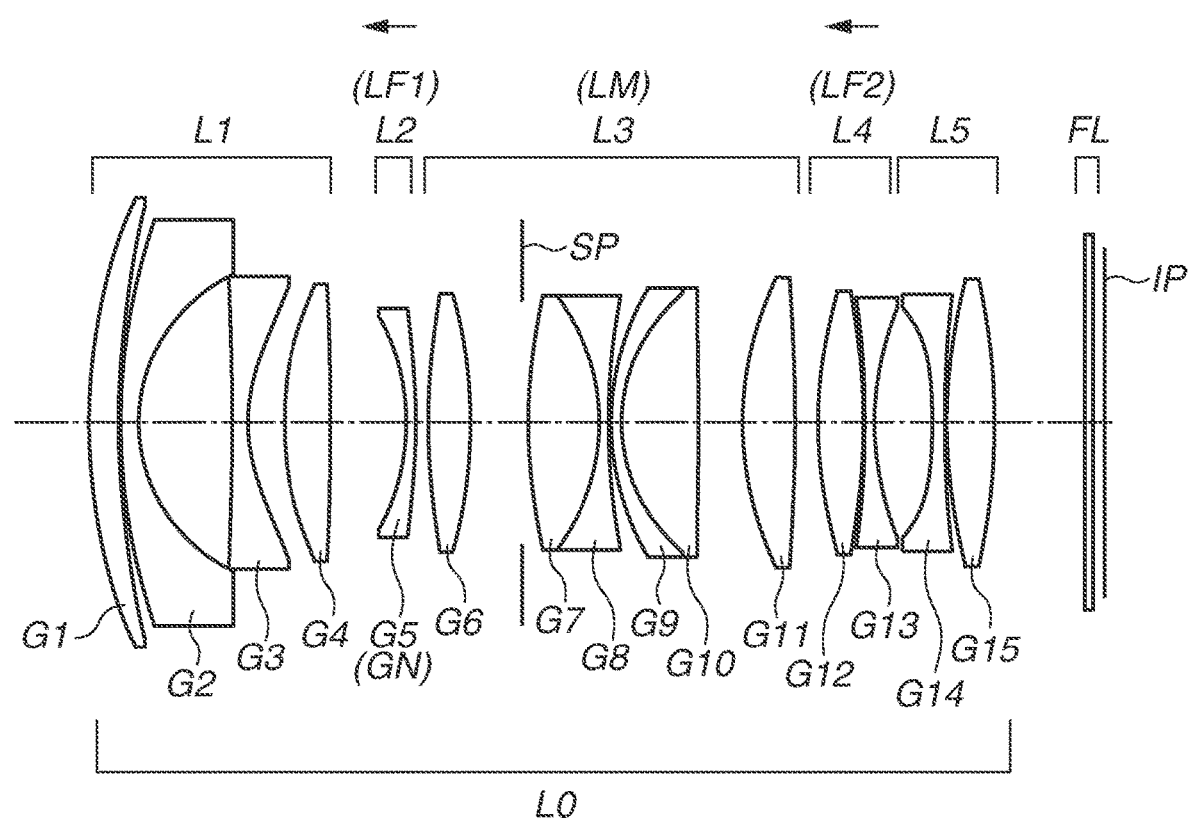
FIG. 7 is a cross-sectional view illustrating an optical system according to a fourth exemplary embodiment.
Figure 8A:
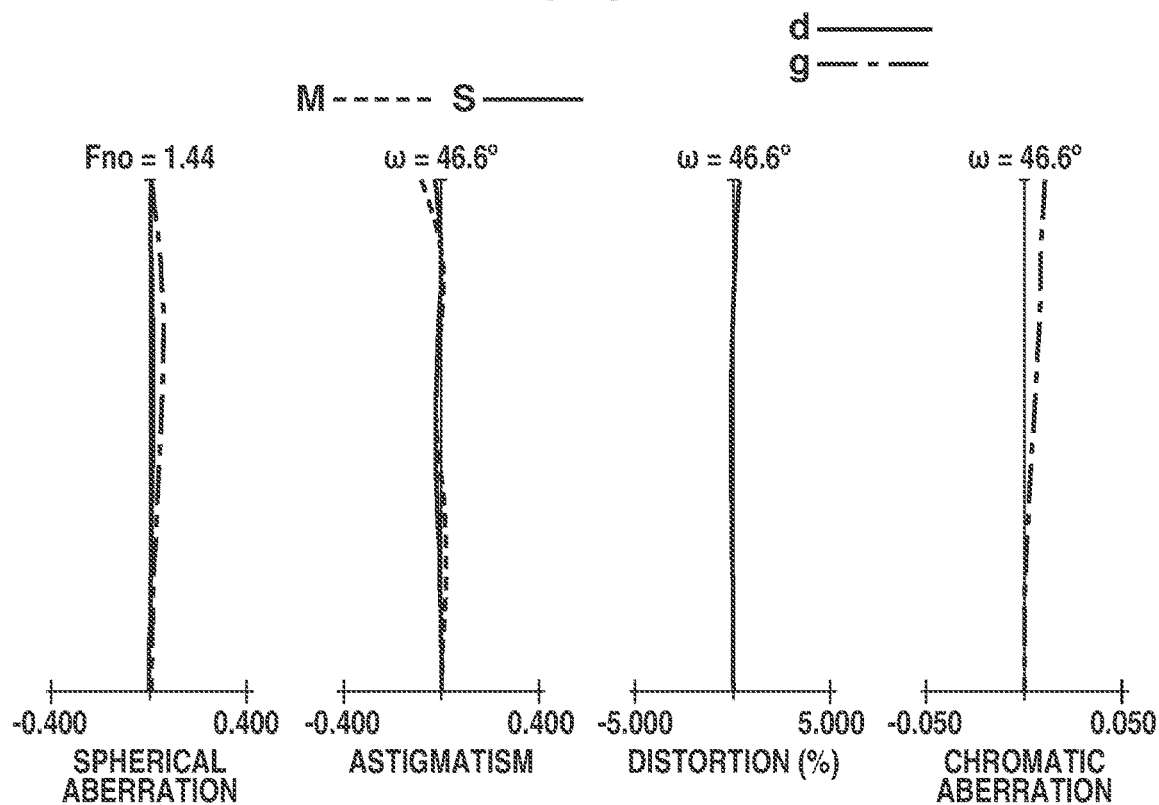
FIGS. 8A and 8B are aberration diagrams illustrating an optical system according to the fourth exemplary embodiment.
Figure 8B:
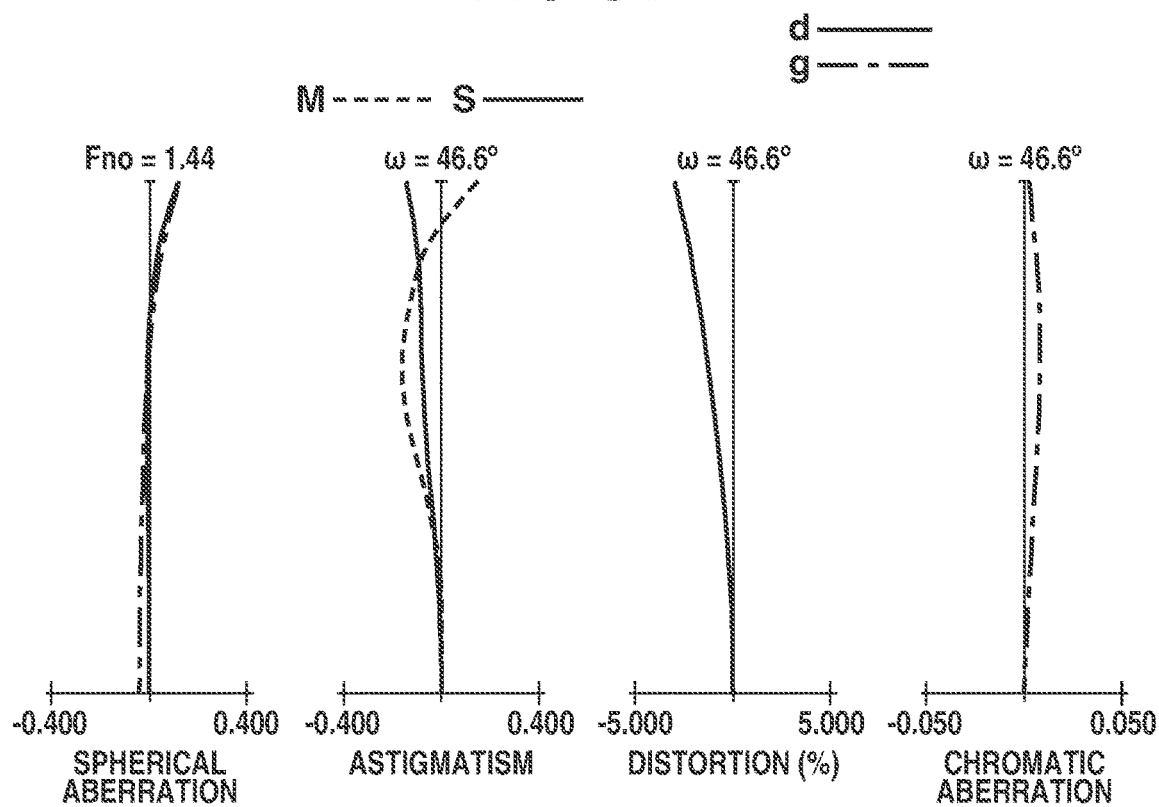
Figure 9:
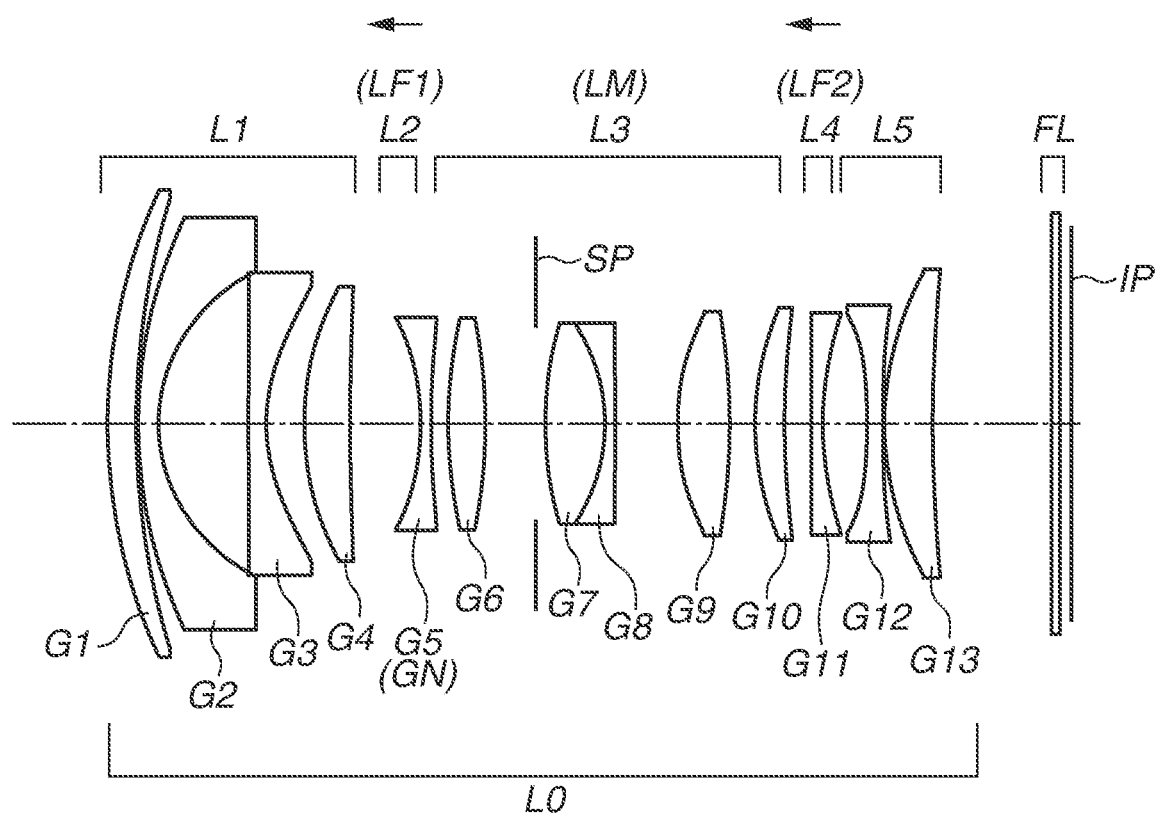
FIG. 9 is a cross-sectional view illustrating an optical system according to a fifth exemplary embodiment.
Figure 10A:
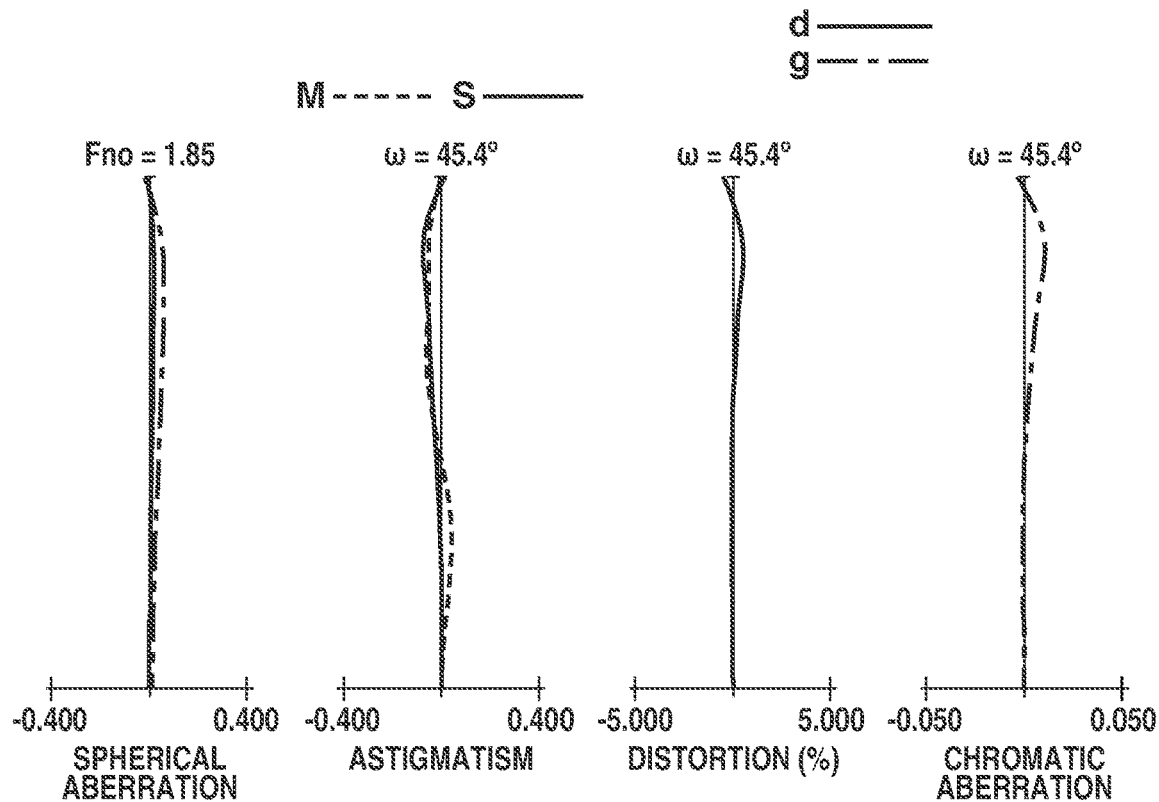
FIGS. 10A and 10B are aberration diagrams illustrating an optical system according to the fifth exemplary embodiment.
Figure 10B:
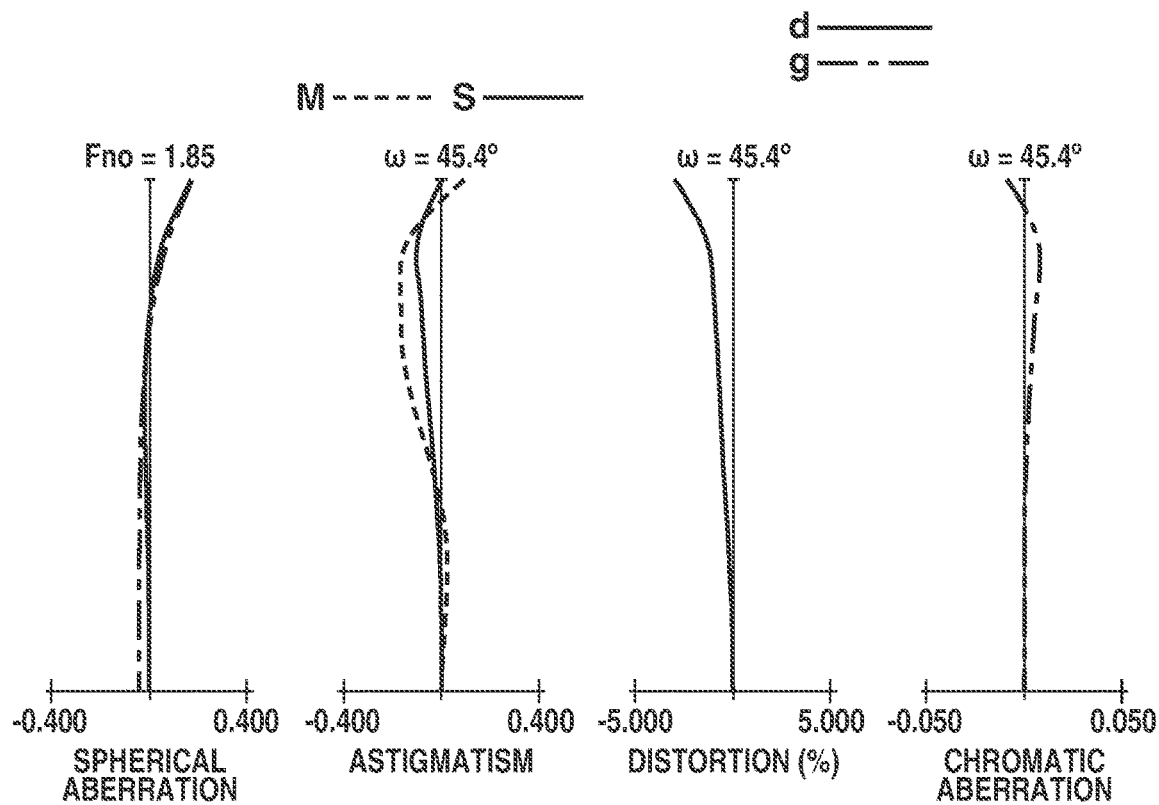
Figure 11:
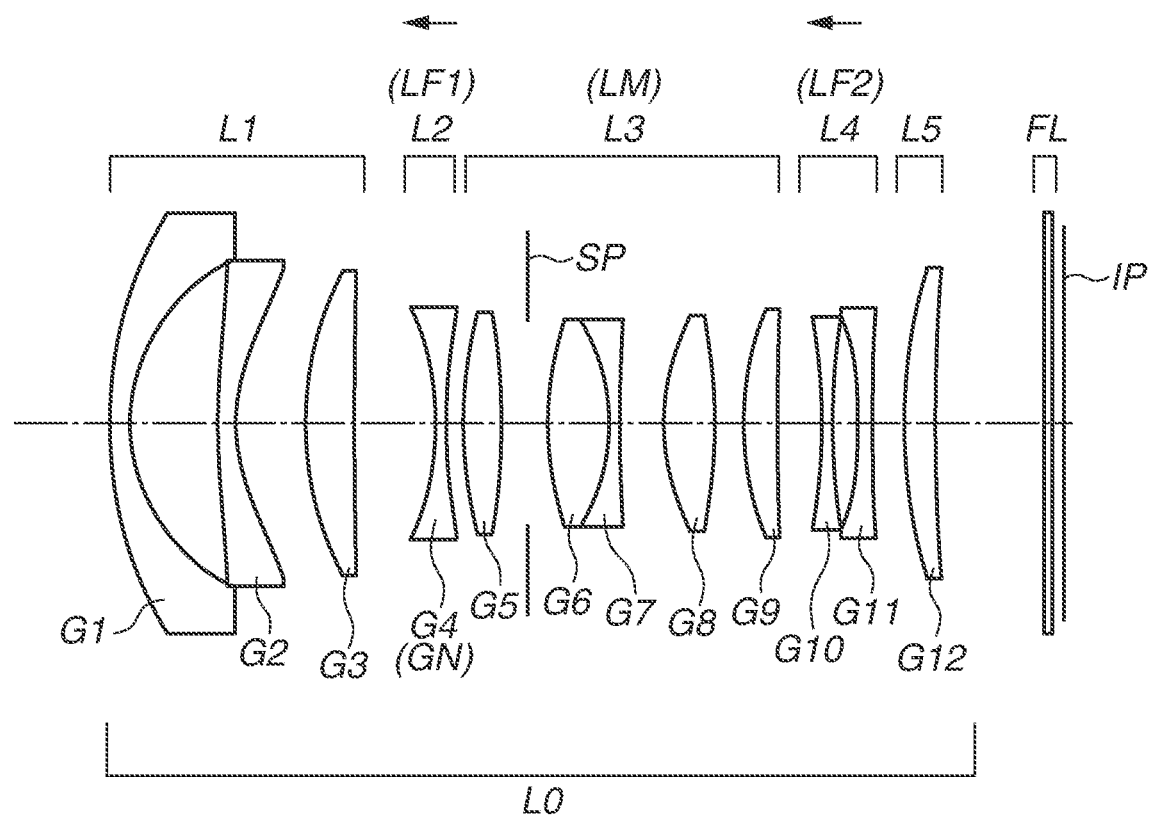
FIG. 11 is a cross-sectional view illustrating an optical system according to a sixth exemplary embodiment.
Figure 12A:
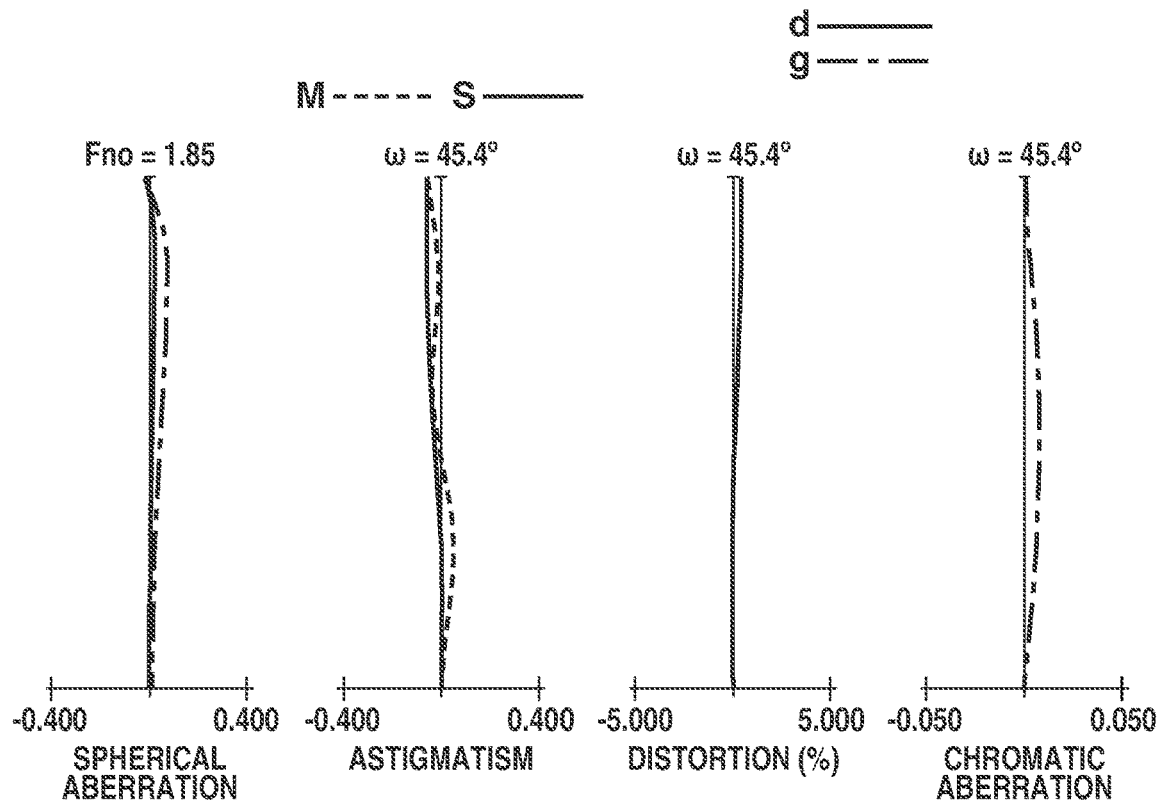
FIGS. 12A and 12B are aberration diagrams illustrating an optical system according to the sixth exemplary embodiment.
Figure 12B:
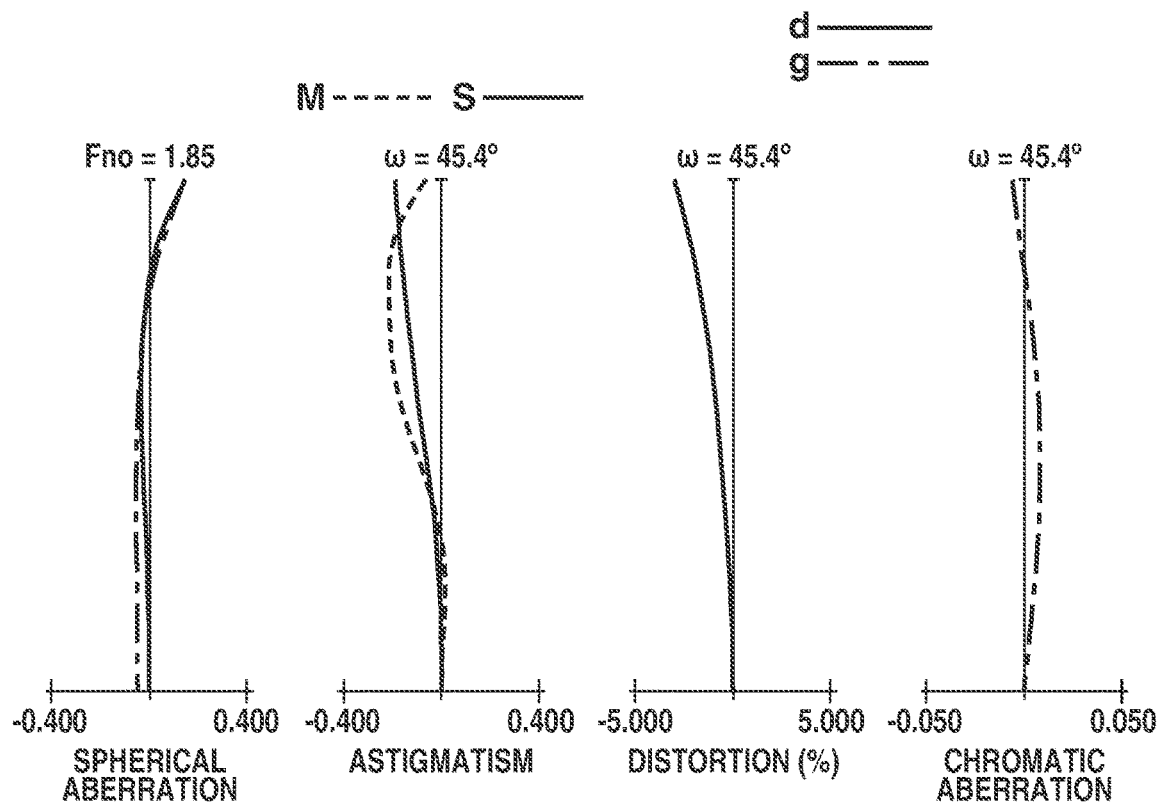
Figure 13:
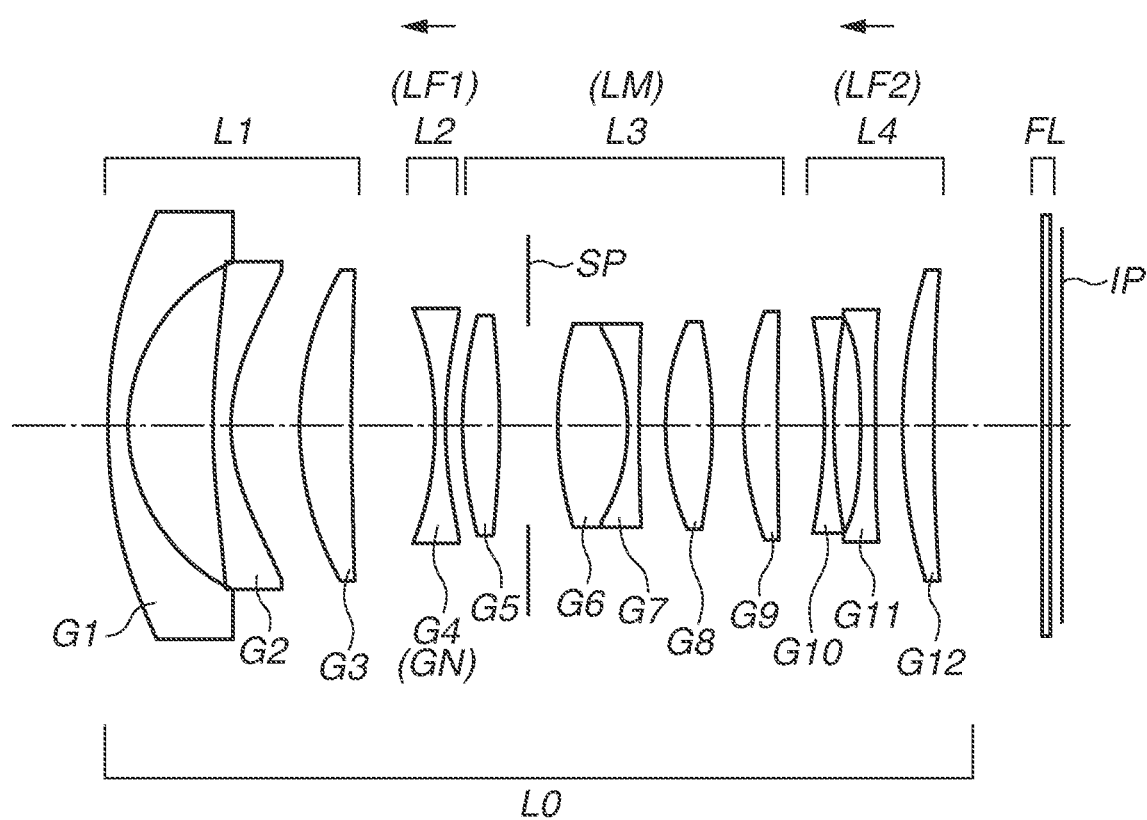
FIG. 13 is a cross-sectional view illustrating an optical system according to a seventh exemplary embodiment.
Figure 14A:
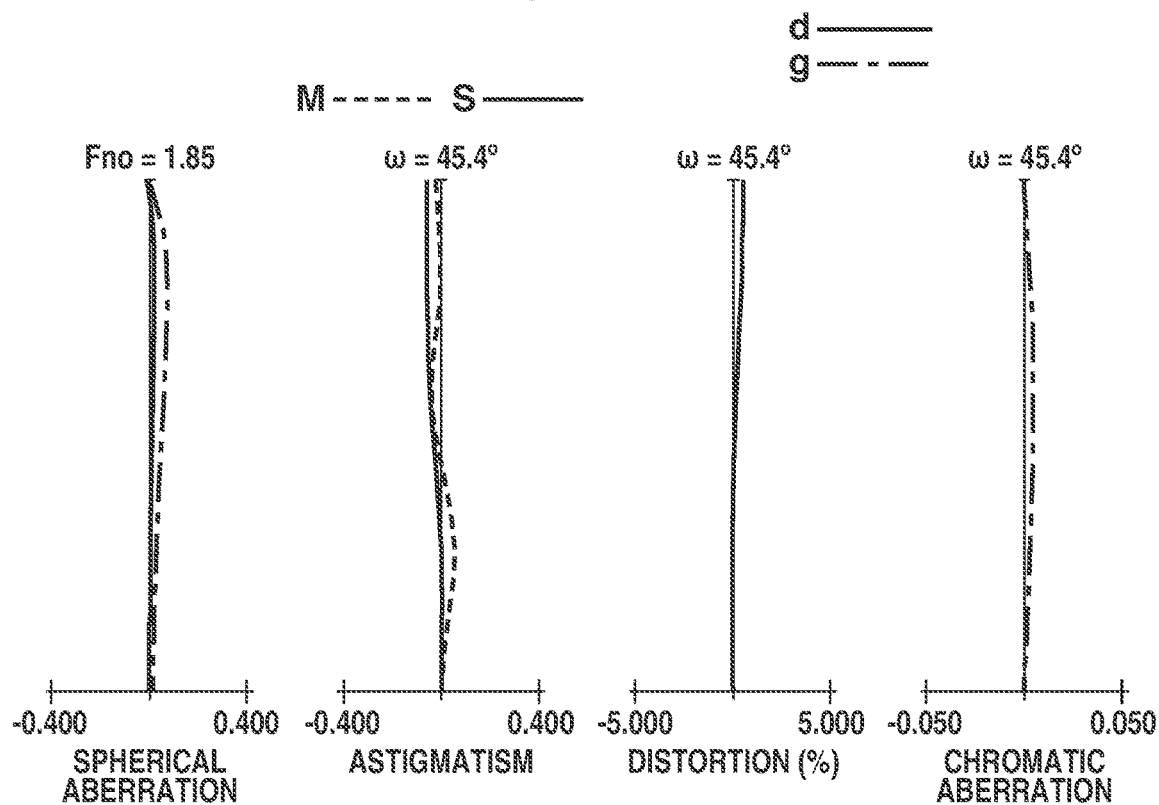
FIGS. 14A and 14B are aberration diagrams illustrating an optical system according to the seventh exemplary embodiment.
Figure 14B:
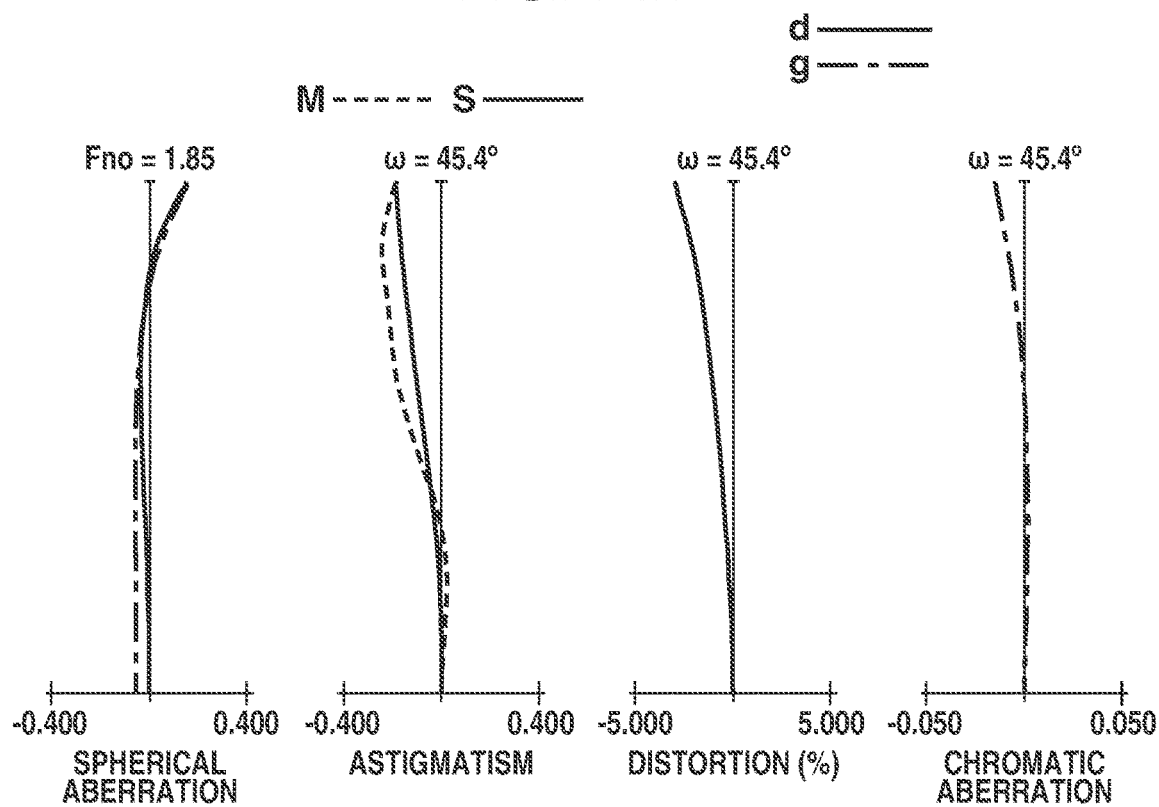
Figure 16A:
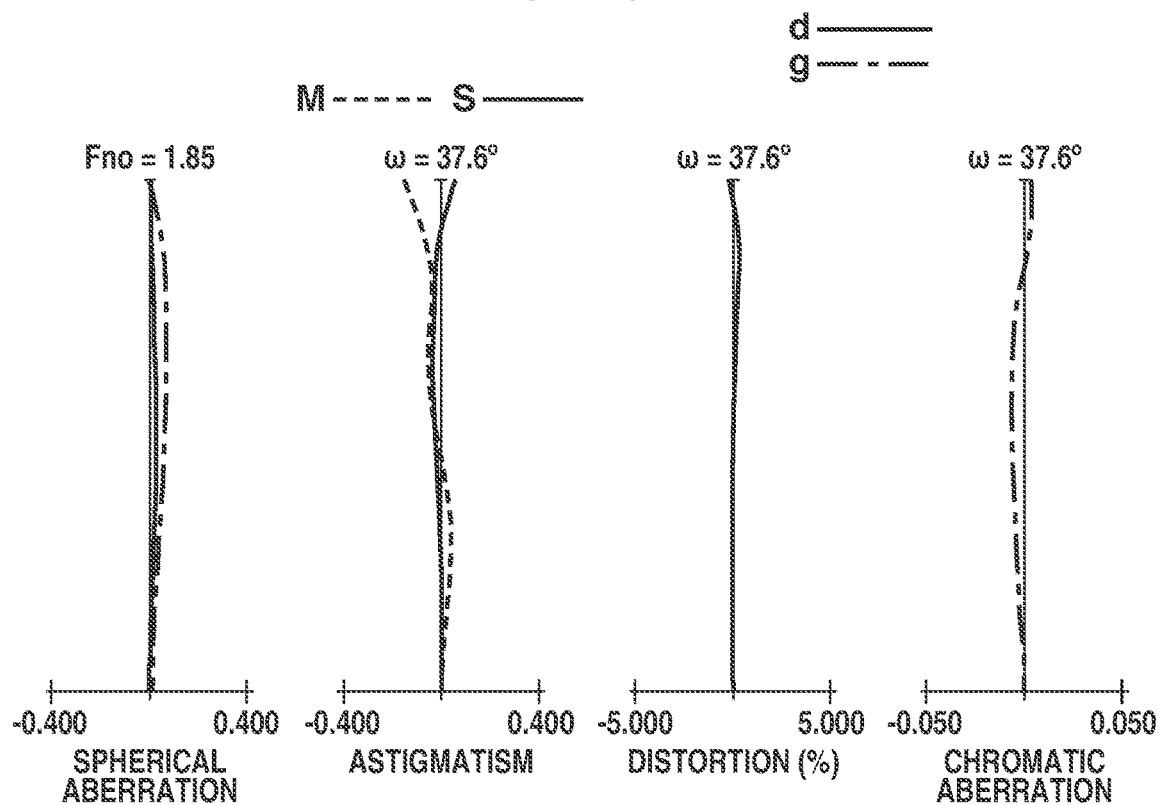
FIGS. 16A and 16B are aberration diagrams illustrating an optical system according to the eighth exemplary embodiment.
Figure 16B:
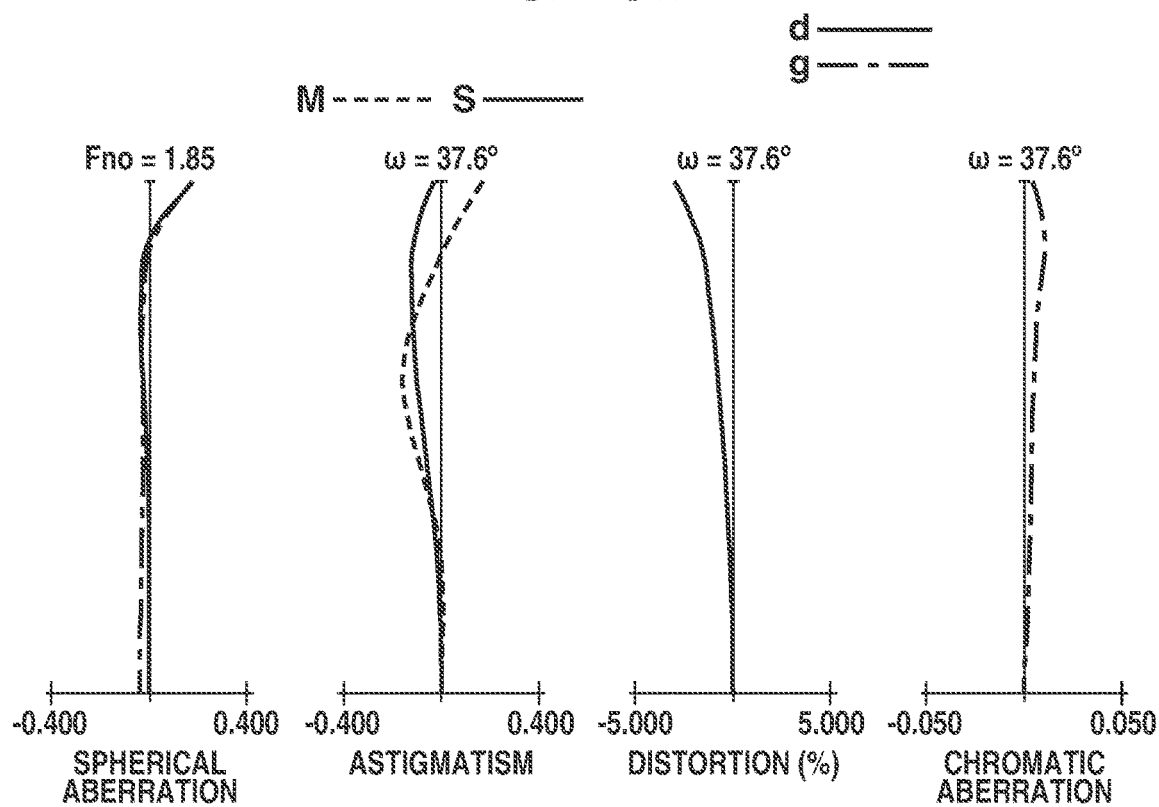

Optical systems and image capturing apparatuses including the same according to various exemplary embodiments of the disclosure will be described below with reference to the attached drawings.

FIGS. 1, 3, 5, 7, 9, 11, 13, and 15 are cross-sectional views illustrating an optical system L0 focusing on an object at infinity according to first to eighth exemplary embodiments, respectively. The optical system L0 according to any of the first to eighth exemplary embodiments is applicable to image capturing apparatuses such as digital video cameras, digital still cameras, broadcasting cameras, silver-halide film cameras, monitoring cameras, and in-vehicle cameras. The optical system L0 according to any of the first to eighth exemplary embodiments can also be used as a projection lens of a projector.

In each cross-sectional view of lenses, the left-hand side is an object side, and the right-hand side is an image side. In a case where the optical system L0 according to any one of the first to eighth exemplary embodiments is used as a projection lens, the left-hand side is a screen side, and the right-hand side is a projected-image side.

The optical systems L0 according to the first to eighth exemplary embodiments each includes a plurality of lens units. In the present specification, the term "lens unit" refers to a set of lenses moved or fixed integrally in focusing. Specifically, in the optical systems L0 according to the first to eighth exemplary embodiments, the distances between adjacent lens units change when a focus is shifted from an object at infinity to an object at a short distance. Each lens unit can include of a single lens or a plurality of lenses. Further, each lens unit can include an aperture stop.

In each cross-sectional view of the lenses, Gi is the ith (i is a natural number) lens from the object side. In a compound lens, each single lens element of the compound lens is counted as one lens.

In each cross-sectional view of the lenses, Lj is the jth (j is a natural number) lens units from the object side.

Each arrow in each cross-sectional view of the lenses represents a moving direction of the lens unit (focusing unit) that is moved when a focus is shifted from an object at infinity to an object at a short distance.

Each cross-sectional view of the lenses illustrates an aperture stop SP and an image plane IP. In a case where the optical systems L0 according to the first to eighth exemplary embodiments are used as an image capturing optical system of a digital still camera or a digital video camera, an image capturing surface of a solid-state image sensor (a photoelectric conversion element) such as a charge-coupled device (CCD) sensor or a complementary metal oxide semiconductor (CMOS) sensor is arranged on the image plane IP. In a case where the optical system L0 according to any one of the first to eighth exemplary embodiments is used as an image capturing optical system of a silver-halide film camera, a photosensitive surface corresponding to a film surface is arranged on the image plane IP.

Further, an optical block FL is an optical block corresponding to an optical filter, a face plate, a crystal low-pass filter, or an infrared cut filter.

The optical systems L0 according to the first, second, fourth, and fifth exemplary embodiments each includes of a first lens unit L1 having a negative refractive power, a second lens unit L2 having a negative refractive power, a third lens unit L3 having a positive refractive power, a fourth lens unit L4 having a negative refractive power, and a fifth lens unit L5 having a negative refractive power, arranged in this order from the object side to the image side. When a focus is shifted from an object at infinity to an object at a short distance, the second lens unit L2 and the fourth lens unit L4 move to the object side along different trajectories from each other. Specifically, the second lens unit L2 and the fourth lens unit L4 function as a first focusing unit LF1 and a second focusing unit LF2, respectively.

The optical system L0 according to the third exemplary embodiment includes of the first lens unit L1 having a positive refractive power, the second lens unit L2 having a negative refractive power, the third lens unit L3 having a positive refractive power, the fourth lens unit L4 having a negative refractive power, and the fifth lens unit L5 having a negative refractive power, arranged in this order from the object side to the image side. When a focus is shifted from an object at infinity to an object at a short distance, the second lens unit L2 and the fourth lens unit L4 move to the object side along different trajectories from each other. Specifically, the second lens unit L2 and the fourth lens unit L4 function as the first focusing unit LF1 and the second focusing unit LF2, respectively.

The optical system L0 according to the sixth exemplary embodiment includes of the first lens unit L1 having a negative refractive power, the second lens unit L2 having a negative refractive power, the third lens unit L3 having a positive refractive power, the fourth lens unit L4 having a negative refractive power, and the fifth lens unit L5 having a positive refractive power, arranged in this order from the object side to the image side. When a focus is shifted from an object at infinity to an object at a short distance, the second lens unit L2 and the fourth lens unit L4 move to the object side along different trajectories from each other. Specifically, the second lens unit L2 and the fourth lens unit L4 function as the first focusing unit LF1 and the second focusing unit LF2.

The optical system L0 according to the seventh exemplary embodiment includes of the first lens unit L1 having a negative refractive power, the second lens unit L2 having a negative refractive power, the third lens unit L3 having a positive refractive power, and the fourth lens unit L4 having a negative refractive power, arranged in this order from the object side to the image side. When a focus is shifted from an object at infinity to an object at a short distance, the second lens unit L2 and the fourth lens unit L4 move to the object side along different trajectories from each other. Specifically, the second lens unit L2 and the fourth lens unit L4 function as the first focusing unit LF1 and the second focusing unit LF2.

The optical system L0 according to the eighth exemplary embodiment includes of the first lens unit L1 having a negative refractive power, the second lens unit L2 having a negative refractive power, the third lens unit L3 having a positive refractive power, the fourth lens unit L4 having a negative refractive power, and the fifth lens unit L5 having a negative refractive power, arranged in this order from the object side to the image side. When a focus is shifted from an object at infinity to an object at a short distance, the second lens unit L2 and the fourth lens unit L4 move to the image side along different trajectories from each other. Specifically, the second lens unit L2 and the fourth lens unit L4 function as the first focusing unit LF1 and the second focusing unit LF2.

While the optical systems L0 according to the first to eighth exemplary embodiments in which only the first focusing unit LF1 and the second focusing unit LF2 move are described as an example, a lens unit other than the first focusing unit LF1 and the second focusing unit LF2 can also move in focusing. This further reduces aberration variations in focusing.

Further, the moving direction of each focusing unit in focusing in the optical systems L0 according to the first to eighth exemplary embodiments can be either from the object side to the image side or from the image side to the object side. This is because one of the focusing units serves as a main focusing unit (the focusing unit having mainly an effect of correcting a change in an image plane position that is caused by a fluctuation in object distance), and the other focusing unit corrects aberration variations in focusing by the main focusing unit. Depending on which one of the first focusing unit LF1 and the second focusing unit LF2 serves as the main focusing unit, the moving direction of the other focusing unit changes.

In the first to seventh exemplary embodiments, the first focusing unit LF1 is the main focusing unit, and the first focusing unit LF1 moves from the image side to the object side when a focus is shifted from an object at infinity to an object at a short distance. The second focusing unit LF2 moves from the image side to the object side when a focus is shifted from an object at infinity to an object at a short distance. In the eighth exemplary embodiment, the second focusing unit LF2 is the main focusing unit, and the second focusing unit LF2 moves from the object side to the image side when a focus is shifted from an object at infinity to an object at a short distance. The first focusing unit LF1 moves from the object side to the image side when a focus is shifted from an object at infinity to an object at a short distance.

FIGS. 2A, 2B, 4A, 4B, 6A, 6B, 8A, 8B, 10A, 10B, 12A, 12B, 14A, 14B, 16A, and 16B are aberration diagrams respectively illustrating aberrations in the optical systems L0 according to the first to eighth exemplary embodiments. FIGS. 2A, 4A, 6A, 8A, 10A, 12A, 14A, and 16A are aberration diagrams in a case where an object at infinity is focused, and FIGS. 2B, 4B, 6B, 8B, 10B, 12B, 14B, and 16B are aberration diagrams in a case where an object at a short distance is focused.

In each spherical aberration diagram, Fno denotes an F-number, and the spherical aberration diagram shows a spherical aberration amount with respect to a d-line (wavelength 587.6 nm) and a spherical aberration amount with respect to a g-line (wavelength 435.8 nm). In each astigmatism diagram, S denotes an aberration amount on a sagittal image plane, and M denotes an aberration amount on a meridional image plane. Each distortion aberration diagram illustrates a distortion aberration amount with respect to the d-line. Each chromatic aberration diagram illustrates a magnification chromatic aberration amount with respect to the g-line. In each diagram, ω denotes an imaging half angle of view (degrees).

Next, features of the optical systems L0 according to the first to eighth exemplary embodiments will be described below.

The optical systems L0 according to the first to eighth exemplary embodiments each include the first lens unit (front lens unit) L1 and two focusing units LF1 and LF2 having a negative refractive power. The first lens unit (front lens unit) L1 is arranged closest to the object side. The focusing units LF1 and LF2 are on the image side of the front lens unit and move along different trajectories from each other in focusing. In focusing, the distance between the first focusing unit LF1 and the second focusing unit LF2 on an optical axis changes.

As described above, since the refractive powers of the two focusing units LF1 and LF2 of the optical systems L0 according to the first to eighth exemplary embodiments are both negative, aberrations in the optical system L0 that occur when the focusing units LF1 and LF2 are moved can be easily reduced. This makes it easy to reduce fluctuations in off-axis aberrations in focusing even in a case where the first focusing unit LF1 and the second focusing unit LF2 each consist of a few lenses.

Specifically, with the above-described unit structure, the optical systems L0 according to the first to eighth exemplary embodiments can achieve high optical performance in a wide image capturing range from an infinite distance to a short distance and can also reduce aberration variations in focusing.

Further, the optical systems L0 according to the first to eighth exemplary embodiments each satisfy the following inequalities (1) to (3):

$$0.00 < |fF1|/|f1| < 0.77 \quad (1),$$

$$-0.76 < sk/fF1 < 0.00 \quad (2), \text{ and}$$

$$0.10 < fF1/fF2 < 1.90 \quad (3).$$

In the inequalities (1) to (3), fF1 is the focal length of the first focusing unit LF1, fF2 is the focal length of the second focusing unit LF2, f1 is the focal length of the first lens unit (front lens unit) L1, and sk is the air conversion length of the back focus of the optical system L0 when a focus is on an object at infinity.

The inequality (1) defines the ratio between the absolute value |fF1| of the focal length of the first focusing unit LF1 and the absolute value |f1| of the focal length of the first lens unit (front lens unit) L1. This indicates that it is to reduce the value of |fF1| and increase the value of |f1| within a range that satisfies the inequality (1). An effect of the inequality (1) can be produced regardless of whether the sign of f1 is positive or negative.

By increasing the value of |f1|, the first lens unit (front lens unit) L1 becomes substantially afocal, and axial rays entering the first focusing unit LF1 become substantially parallel. This reduces aberration variations in focusing, such as a spherical aberration and a meridional coma aberration. As a result, desired characteristics can be easily realized with the first focusing unit LF1 that includes of a fewer lenses.

Further, as axial rays entering the first focusing unit LF1 become substantially parallel, the lateral magnification of the first focusing unit LF1 becomes a small value (a value close to zero). This increases the focus sensitivity (the ratio of the amount of movement of the image plane to the amount of movement of the focusing unit) of the first focusing unit LF1. This reduces the amount of movement of the first focusing unit LF1 in focusing and realizes high-speed focusing.

Further, by decreasing the value of |fF1| (by increasing the negative refractive power), rays entering the lens in a substantially parallel manner are bounced significantly, and the effect of bringing the lateral magnification of the first focusing unit LF1 to a small value (a value close to zero) is further increased.

In a case where the value of |fF1| is decreased while the ratio falls below the lower limit value of the inequality (1), this is undesirable because the negative refractive power of the first focusing unit LF1 becomes excessively high, and aberration variations such as a field curvature and a magnification chromatic aberration in focusing become excessively large.

In a case where the value of |fF1| is increased while the ratio exceeds the upper limit value of the inequality (1), this is also undesirable because the negative refractive power of the first focusing unit LF1 becomes excessively low, the focus sensitivity becomes low, and high-speed focusing becomes difficult.

The inequality (2) defines the ratio between the air-converted back focus sk from the last lens surface to the image plane IP and the focal length fF1 of the first focusing unit LF1. This indicates that it is to reduce the value of sk within the range that satisfies the inequality (2). As to the last lens surface, an optical surface of the optical block FL that has substantially no refractive power, such as an optical filter, a face plate, a crystal low-pass filter, or an infrared cut filter, is not taken into consideration.

By decreasing the value of sk, a lens can be arranged near the image plane IP where the height of on-axis rays is small and the height of off-axis rays is large. This suitably corrects off-axis aberrations such as a field curvature, a distortion aberration, and a magnification chromatic aberration.

In a case where the value of sk is increased while the ratio falls below the lower limit value of the inequality (2), this is undesirable because the effect of correcting off-axis aberrations decreases.

In a case where the value of sk is decreased while the ratio exceeds the upper limit value of the inequality (2), this is also undesirable because the diameter of a lens arranged near the image plane IP becomes excessively large even though the effect of correcting off-axis aberrations increases.

The inequality (3) defines the ratio between the focal length fF1 of the first focusing unit LF1 and the focal length fF2 of the second focusing unit LF2. This is to prevent the symmetry of the refractive power arrangement of the optical system L0 from breaking in focusing. The inequality (3)

indicates that there is not excessive unevenness in the refractive power of the first focusing unit LF1 having a negative refractive power and the second focusing unit LF2 having a negative refractive power.

In a case where the absolute value of fF1 is increased (the value of fF1 is decreased) while the ratio falls below the lower limit value of the inequality (3), this is undesirable because the focus sensitivity of the first focusing unit LF1 becomes low, and the amount of movement in focusing becomes excessively large. On the other hand, in a case where the absolute value of fF2 is decreased (the value of fF2 is increased), this is also undesirable because the negative refractive power of the second focusing unit LF2 becomes excessively high, and aberrations such as a field curvature, a distortion aberration, and a magnification chromatic aberration in focusing are excessively corrected.

In a case where the absolute value of fF1 is decreased (the value of fF1 is increased) while the ratio exceeds the upper limit value of the inequality (3), this is undesirable because the focus sensitivity of the first focusing unit LF1 becomes excessively high, and it becomes difficult to control the amount of lens movement mechanically and electrically in focusing. It is undesirable for another reason that aberration variations in focusing become excessively large. On the other hand, in a case where the absolute value of fF2 is decreased (the value of fF2 is increased), this is also undesirable because the negative refractive power of the second focusing unit LF2 becomes excessively high, and aberrations such as a field curvature, a distortion aberration, and a magnification chromatic aberration in focusing are excessively corrected.

With the above-described arrangement, an optical system L0 with high optical performance and smaller aberration variations in focusing is realized.

In one embodiment, the numerical ranges of the inequalities (1), (2), and (3) are the ranges of the following inequalities (1a), (2a), and (3a):

$$0.02 < |fF1|/|f1| < 0.72 \quad (1a),$$

$$-0.70 < sk/fF1 < -0.10 \quad (2a), \text{ and}$$

$$0.15 < fF1/fF2 < 1.70 \quad (3a).$$

In another embodiment, the numerical ranges of the inequalities (1), (2), and (3) are the ranges of the following inequalities (1b), (2b), and (3b):

$$0.04 < |fF1|/|f1| < 0.71 \quad (1b),$$

$$-0.60 < sk/fF1 < -0.20 \quad (2b), \text{ and}$$

$$0.25 < fF1/fF2 < 1.55 \quad (3b).$$

Next, conditions that each optical system L0 according to the first to eighth exemplary embodiments satisfies will be described below.

In one embodiments, each optical system L0 according to the first to eighth exemplary embodiments satisfies at least one of the following inequalities (4) to (13). Although these configurations are not essential for producing an effect of the aspect of the embodiments, better optical performance can be developed with the configurations.

$$0.05 < Dair\_max/L < 0.25 \quad (4)$$

$$-2.50 < (R1+R2)/(R1-R2) < 0.50 \quad (5)$$

$$0.15 < DSP1/DSP2 < 0.70 \quad (6)$$

$$0.35 < sk/(f \times \tan \omega) < 0.90 \quad (7)$$

$$0.20 < |MLF1|/|MLF2| < 7.00 \quad (8)$$

$$-1.20 < fF/f < -0.40 \quad (9)$$

$$-1.30 < fF/D < -0.20 \quad (10)$$

$$15.00 < vp < 35.00 \quad (11)$$

$$0.45 < f2/f < 1.60 \quad (12)$$

$$-3.05 < RLF1/f < -0.60 \quad (13)$$

In the inequalities (4) to (13), Dair_max is an air distance that is formed between a lens surface closest to the object side to a lens surface closest to the image side (excluding a surface of the optical block FL such as an optical filter) in the optical system L0 and is the greatest air distance on the optical axis, L is the distance from the lens surface closest to the object side to the lens surface closest to the image side (excluding a surface of the optical block FL such as an optical filter) on the optical axis in the optical system L0, R1 is the radius of curvature of an object-side lens surface of a negative lens GN of the first focusing unit LF1, R2 is the radius of curvature of an image-side lens surface of the negative lens GN, DSP1 is the distance from a lens surface closest to the image side in the first focusing unit LF1 to the aperture stop SP on the optical axis, DSP2 is the distance from the aperture stop SP to a lens surface closest to the object side in the second focusing unit LF2 on the optical axis, ω is the half angle of view of the optical system L0 when a focus is on an object at infinity, f is the focal length of the optical system L0, MLF1 is the amount of movement of the first focusing unit LF1 with respect to the image plane IP on the optical axis when a focus is shifted from an object at infinity to an object at a short distance, MLF2 is the amount of movement of the second focusing unit LF2 with respect to the image plane IP on the optical axis when a focus is shifted from an object at infinity to an object at a short distance, fF is the combined focal length of the first lens unit (front lens unit) L1 and the first focusing unit LF1, D is the distance between the lens surface closest to the object side in the first lens unit (front lens unit) L1 to the lens surface closest to the image side in the first focusing unit LF1 on the optical axis, and vp is the Abbe number of a positive lens of the first lens unit (front lens unit) L1. The Abbe number vd of an optical material is given by:

$$vd = (Nd-1)/(NF-NC),$$

where Nd, NF, NC, and Ng are refractive indexes of the optical material at the d-line (587.6 nm), the F-line (486.1 nm), the C-line (656.3 nm), and the g-line (wavelength 435.8 nm) of the Fraunhofer lines, respectively.

Further, f2 is the focal length of a lens unit (intermediate unit LM) between the first focusing unit LF1 and the second focusing unit LF2, and RLF1 is the radius of curvature of the lens surface closest to the object side in the first focusing unit LF1.

The inequality (4) defines the ratio between the maximum air distance Dair_max of the optical system L0 and the total length L of the optical system. This indicates that the total length of the optical system L0 is decreased by decreasing the value of Dair_max within the range that satisfies the inequality (4). In a case where the optical system L0 is a zoom lens, Dair_max is the maximum air distance in a focal range from a wide angle end to a telephoto end.

In the first exemplary embodiment, Dair_max is an air distance including the aperture stop SP. In the second, sixth, and seventh exemplary embodiments, Dair_max is an air distance between G1 and G2. In the third, fourth, and fifth exemplary embodiments, Dair_max is an air distance between G2 and G3. In the eighth exemplary embodiment, Dair_max is an air distance between G11 and G12.

In a case where the value of Dair_max is decreased while the ratio falls below the lower limit value of the inequality (4), it becomes difficult to arrange the aperture stop SP and to keep a sufficient distance for the focusing unit to move. The configuration without a deep concave lens (especially a negative meniscus lens arranged in the first lens unit L1 and having a concave facing the image side) may be disadvantageous in widening the angle of the optical system L0.

In a case where the value of Dair_max is increased while ratio exceeds the upper limit value of the inequality (4), the optical system L0 increases in size.

The inequality (5) defines the shape of the negative lens GN of the first focusing unit LF1. Specifically, the first focusing unit LF1 includes the negative lens GN that satisfies the inequality (5). With a shape that satisfies the inequality (5), the difference between an angle of off-axis rays entering the first focusing unit LF1 and an angle of off-axis rays emerging from the first focusing unit LF1 is reduced. This reduces fluctuations of off-axis aberrations such as a field curvature and a magnification chromatic aberration in focusing.

In a case where the value is decreased to fall below the lower limit value of the inequality (5), the difference between the angles of the off-axis rays becomes excessively large, and fluctuations of off-axis aberrations in focusing increase.

In a case where the value is increased to exceed the upper limit value of the inequality (5), the refractive power of the negative lens of first focusing unit LF1 becomes excessively high, and fluctuations in a spherical aberration in focusing increase.

The inequality (6) defines the ratio between the distance DSP1 from the aperture stop SP to the first focusing unit LF1 and the distance DSP2 from the aperture stop SP to the second focusing unit LF2. As a result of arranging the focusing units LF1 and LF2 on the object side and the image side of the aperture stop SP to satisfy the inequality (6), (the absolute values of) the heights of off-axis rays passing through the focusing units LF1 and LF2 become substantially the same, and the symmetry of the rays with respect to the aperture stop SP increases. This facilitates correction of off-axis aberrations in focusing.

In a case where the value of DSP1 is decreased or the value of DSP2 is increased while the ratio falls below the lower limit value of the inequality (6), the foregoing symmetry becomes excessively low, and the effect of correcting off-axis aberrations in focusing decreases. Further, in a case where the value of DSP2 is increased, the aperture of the second focusing unit LF2 becomes excessively large, and the weight of the second focusing unit LF2 increases.

In a case where the value of DSP1 is increased or the value of DSP2 is decreased while the ratio exceeds the upper limit value of the inequality (6), the foregoing symmetry becomes excessively low, and the effect of correcting off-axis aberrations in focusing decreases. Furthermore, in a case where the value of DSP1 is increased, the aperture of the first focusing unit LF1 becomes excessively large, and the weight of the first focusing unit LF1 increases.

The inequality (7) defines the ratio between the air-converted back focus sk and the image height. This indicates that as a result of decreasing the value of sk within a range that satisfies the inequality (7), a lens is arranged at a position where the height of on-axis rays is small and the height of off-axis rays is large, so that field curvatures are selectively and suitably corrected without affecting a spherical aberration and a meridional coma aberration.

In a case where the value of sk is decreased while the ratio falls below the lower limit value of the inequality (7), an aperture of a lens near the image plane IP becomes excessively large. Furthermore, the angle of off-axis rays entering the image plane IP becomes excessively large, and thus it may become difficult to realize telecentric performance in a range compatible with the solid-state image sensor.

In a case where the value of sk is increased while the ratio exceeds the upper limit value of the inequality (7), field curvatures may not be corrected sufficiently.

The inequality (8) defines the ratio between the absolute value |MLF1| of the amount of movement of the first focusing unit LF1 with respect to the image plane IP on the optical axis and the absolute value |MLF2| of the amount of movement of the second focusing unit LF2 with respect to the image plane IP on the optical axis when a focus is shifted from an object at infinity to an object at a short distance. The signs of the amounts of movement MLF1 and MLF2 can be either positive or negative.

In a case where the value of |MLF1| is decreased while the ratio falls below the lower limit value of the inequality (8), the negative refractive power of the first focusing unit LF1 becomes excessively high, and fluctuation in a spherical aberration in focusing increase. Further, in a case where the value of |MLF2| is increased while the ratio falls below the lower limit value, the amount of movement of the second focusing unit LF2 becomes excessively large.

In a case where the value of |MLF2| is decreased while the ratio exceeds the upper limit value of the inequality (8), the negative refractive power of the second focusing unit LF2 becomes excessively high, and off-axis aberrations in focusing may be corrected excessively. In a case where the value of |MLF1| is increased while the ratio exceeds the upper limit value, the amount of movement of the first focusing unit LF1 becomes excessively large.

The inequality (9) defines the ratio between the combined focal length fF of the first lens unit (front lens unit) L1 and the first focusing unit LF1 and the focal length f of the entire system.

In a case where the value of fF is decreased (the absolute value of fF is increased) while the ratio falls below the lower limit value of the inequality (9), the negative refractive power on the object side of the aperture stop SP becomes excessively low. In this case, it is difficult to achieve a retrofocus type power arrangement. At this time, it is difficult to secure a sufficient total length and a sufficient back focus for suitably correcting aberrations in widening the angle of the optical system L0.

In a case where the value of fF is increased (the absolute value of fF is decreased) while the ratio exceeds the upper limit value of the inequality (9), the negative refractive power on the object side of the aperture stop SP becomes excessively high, and the total length becomes excessively large. Furthermore, an aperture of a lens unit on the image side of the first focusing unit LF1 becomes excessively large.

The inequality (10) defines the ratio between the distance D between the lens surface closest to the object side in the first lens unit (front lens unit) L1 and the lens surface closest to the image side in the first focusing unit LF1 on the optical axis and the combined focal length fF of the first lens unit (front lens unit) L1 and the first focusing unit LF1. It indicates that it is to increase the value of D and the value of fF (it is to decrease the absolute value) within a range that satisfies the inequality (10). This realizes an optical system L0 with a wide angle and smaller aberrations while a sufficient back focus is secured.

In a case where the value of fF is decreased (the absolute value of fF is increased) while the ratio falls below the lower limit value of the inequality (10), the negative refractive power on the object side of the aperture stop SP becomes excessively low, and it becomes difficult to achieve a retrofocus type power arrangement. In this case, it is difficult to secure a sufficient total length and a sufficient back focus for suitably correcting aberrations in widening the angle of the optical system L0. Furthermore, in a case where the value of D is decreased while the ratio falls below the lower limit value, it may become difficult to correct a field curvature and a distortion aberration.

In a case where the value of fF is increased (the absolute value of fF is decreased) while the ratio exceeds the upper limit value of the inequality (10), the negative refractive power on the object side of the aperture stop SP becomes excessively high, and the total length becomes excessively large. Furthermore, an aperture of a lens unit on the image side of the first focusing unit LF1 becomes excessively large.

The inequality (11) defines the Abbe number νp of the positive lens of the first lens unit (front lens unit) L1. Specifically, the first lens unit (front lens unit) L1 includes a positive lens that satisfies the inequality (11).

In a case where the value of νp is decreased to fall below the lower limit value of the inequality (11), a magnification chromatic aberration at the g-line is often over-corrected. In a case where the value of νp is increased to exceed the upper limit value of the inequality (11), a magnification chromatic aberration at the g-line is often under-corrected.

The inequality (12) defines the ratio between the focal length f2 of the intermediate unit LM and the focal length f of the entire system. Specifically, the optical system L0 includes a lens unit (intermediate unit LM) between the first focusing unit LF1 and the second focusing unit LF2, and at this time, it is to satisfy the inequality (12).

In a case where the value of f2 is decreased while the ratio falls below the lower limit value of the inequality (12), this is advantageous in widening the angle of the optical system L0, although it becomes difficult to correct a spherical aberration and a coma aberration. In a case where the value of f2 is decreased while the ratio exceeds the upper limit value of the inequality (12), it is undesirable because it becomes difficult to widen the angle of the optical system L0.

The inequality (13) defines the ratio between the radius of curvature RLF1 of the lens surface closest to the object side in the first focusing unit LF1 and the focal length f of the entire system.

In a case where the value of RLF1 is decreased (the absolute value is increased) while the ratio falls below the lower limit value of the inequality (13), the effect of correcting a field curvature and a distortion aberration in focusing decreases.

In a case where the value of RLF1 is increased (the absolute value is decreased) while the ratio exceeds the upper limit value of the inequality (13), the effect of correcting a field curvature and a distortion aberration in focusing becomes excessive, and fluctuation in a spherical aberration become large.

In one embodiment, the numerical ranges of the inequalities (4) to (13) are the numerical ranges of the following inequalities (4a) to (13a):

$$0.06 < D_{air\_max}/L < 0.20 \quad (4a),$$

$$-2.30 < (R1+R2)/(R1-R2) < 0.30 \quad (5a),$$

$$0.18 < DSP1/DSP2 < 0.60 \quad (6a),$$

$$0.45 < sk/(f \times \tan \omega) < 0.85 \quad (7a),$$

$$0.30 < |MLF1|/|MLF2| < 6.80 \quad (8a),$$

$$-1.10 < fF/f < -0.50 \quad (9a),$$

$$-1.20 < fF/D < -0.30 \quad (10a),$$

$$15.50 < \nu p < 33.00 \quad (11a),$$

$$0.55 < f2/f < 1.55 \quad (12a), \text{ and}$$

$$-2.80 < RLF1/f < -0.75 \quad (13a).$$

In another embodiment, the numerical ranges of the inequalities (4) to (13) are the numerical ranges of the following inequalities (4b) to (13b):

$$0.08 < D_{air\_max}/L < 0.16 \quad (4b),$$

$$-2.00 < (R1+R2)/(R1-R2) < 0.10 \quad (5b),$$

$$0.21 < DSP1/DSP2 < 0.50 \quad (6b),$$

$$0.50 < sk/(f \times \tan \omega) < 0.80 \quad (7b),$$

$$0.40 < |MLF1|/|MLF2| < 6.70 \quad (8b),$$

$$-1.00 < fF/f < -0.60 \quad (9b),$$

$$-1.10 < fF/D < -0.35 \quad (10b),$$

$$16.00 < \nu p < 30.00 \quad (11b),$$

$$0.60 < f2/f < 1.45 \quad (12b), \text{ and}$$

$$-2.60 < RLF1/f < -0.90 \quad (13b).$$

Next, suitable configurations of the optical systems L0 according to the first to eighth exemplary embodiments will be described below. Although these configurations are not essential for producing an advantage of the aspect of the embodiments, better optical performance can be developed with the configurations.

In one embodiment, the first focusing unit LF1 includes of a single lens element having a negative refractive power. With the inequalities (1), (2), and (3) satisfied, aberration variations such as a field curvature and a spherical aberration in focusing are sufficiently reduced even in a case where the first focusing unit LF1 of the optical system L0 includes of a small number of lenses. Thus, higher-speed focusing is realized with the first focusing unit LF1 consisting of a single negative lens.

For better correction of aberration variations in focusing, at least one surface of the negative single lens element is aspheric.

Further, in one embodiment, an intermediate unit LM between the first focusing unit LF1 and the second focusing unit LF2 is provided. At this time, if the intermediate unit LM has a positive refractive power, and a focusing unit having a negative refractive power is arranged on the object side and on the image side of the intermediate unit LM, off-axis aberrations in focusing on an object at infinity are suitably corrected while especially off-axis aberration fluctuations in focusing are also suitably reduced.

Further, the intermediate unit LM includes the aperture stop SP. That is, the aperture stop SP is arranged at substantially the middle of the optical system L0. As a result, the apertures of the lens units on the object side and the image side of the aperture stop SP are less likely to differ from each other significantly, and the entire size of the optical system L0 is reduced. Furthermore, since the aperture stop SP is arranged between the first focusing unit LF1 having a negative refractive power and the second focusing unit LF2 having a negative refractive power, the symmetry of the refractive power for the aperture stop SP increases. Thus, fluctuations of off-axis aberrations in focusing are reduced more easily.

Further, at least part of some of the lens units of the optical system L0 can be moved in a direction perpendicular to the optical axis to correct an image blur.

Further, to configure the optical system L0 with a wide angle of view, the first lens unit (front lens unit) L1 includes at least two negative lenses. In order to achieve an appropriate back focus in widening the angle of the optical system L0, a part with a strong negative refractive power is to be provided on the object side of the aperture stop SP. With this configuration, the strong negative refractive power is shared by the two negative lenses. This facilitates correction of a distortion aberration, a magnification chromatic aberration, and a field curvature. If at least one surface of the at least two negative lenses of the first lens unit (front lens unit) L1 has an aspheric shape, the effect of correcting aberrations is further increased. While the optical systems L0 according to the first to eighth exemplary embodiments have a configuration in which the first lens unit (front lens unit) L1 includes two negative lenses, the number of negative lenses included in the first lens unit (front lens unit) L1 can be three or more.

In one embodiment, the first lens unit (front lens unit) L1 includes a positive lens at a position closest to the object side. This suitably corrects a distortion aberration. The optical systems L0 according to the first, fourth, fifth, and eighth exemplary embodiments employ the configuration in which a positive lens is arranged at a position closest to the object side in the first lens unit (front lens unit) L1.

Further, in the case where the intermediate unit LM is provided, the intermediate unit LM includes at least one compound lens consisting of a positive lens and a negative lens. This suitably corrects an on-axis chromatic aberration, a coma aberration, and a field curvature.

Further, the second focusing unit LF2 can consist of a plurality of lenses. This suitably corrects a magnification chromatic aberration and a field curvature in focusing. In the optical systems L0 according to the fourth, sixth, and seventh exemplary embodiments, the second focusing unit LF2 includes a plurality of lenses.

In one embodiment, a positive lens is arranged at the closest position to the image side in the optical system L0. This makes it easy to realize telecentric performance in a range compatible with the solid-state image sensor.

Further, in the optical systems L0 according to the first to eighth exemplary embodiments, a distortion aberration and a magnification chromatic aberration can remain to some extent. The aberrations can be corrected by an electric image process. Thus, by intentionally configuring the optical system L0 such that the aberrations remain, the size of the optical system L0 is reduced, and other aberrations are suitably corrected.

Next, numerical examples 1 to 8 respectively corresponding to the first to eighth exemplary embodiments will be described below. In each numerical example, a surface number is the order of an optical surface from the object side, m is the radius of curvature of the nth (n is a natural number) optical surface (the nth surface) from the object side, do is the distance between the nth surface and the (n+1)th surface, and ndm and vdm are respectively the refractive index and the Abbe number of the mth optical member.

A back focus (BF) is the air-converted distance from the last lens surface to the image plane IP. A total lens length indicates a value obtained by adding the back focus to the distance from the first lens surface to the last lens surface (excluding the optical block FL corresponding to an optical filter, a face plate, a crystal low-pass filter, or an infrared cut filter).

Further, the sign "*" is given to the right-hand side of the surface number of each optical surface that is aspheric. The aspheric shape is represented by:

$$x=(h^2/R)/[1+\{1-(1+k)(h/R)^2\}^{1/2}+A4 \times h^4+A6 \times h^6+A8 \times h^8+A10 \times h^{10}+A12 \times h^{12},$$

where x is the amount of displacement from a surface vertex in the optical axis direction, h is the height from the optical axis in a direction perpendicular to the optical axis, R is a paraxial radius of curvature, k is a conic constant, and A4, A6, A8, A10, and A12 are aspheric coefficients of respective orders. In each aspheric coefficient, "e±XX" means "×10±xx".

Numerical Example 1

Unit mm
Surface Data

| Surface Number | r | d | nd | vd |
|---|---|---|---|---|
| 1 | 87.534 | 3.63 | 2.00100 | 29.1 |
| 2 | 174.045 | 0.25 | | |
| 3 | 85.847 | 2.30 | 1.88300 | 40.8 |
| 4 | 17.994 | 8.44 | | |
| 5* | 79.201 | 2.00 | 1.58313 | 59.4 |
| 6* | 18.631 | 6.73 | | |
| 7 | 38.819 | 4.59 | 1.96300 | 24.1 |
| 8 | −399.688 | (variable) | | |
| 9 | −29.653 | 1.15 | 1.59270 | 35.3 |
| 10 | 104.068 | (variable) | | |
| 11 | 54.406 | 3.50 | 2.00100 | 29.1 |
| 12 | −72.063 | 4.70 | | |
| 13 (stop) | ∞ | 5.34 | | |
| 14 | 56.675 | 6.43 | 1.49700 | 81.5 |
| 15 | −17.700 | 0.80 | 2.00272 | 19.3 |
| 16 | 191.339 | 0.30 | | |

Unit mm
Surface Data

| | | | | |
|---|---|---|---|---|
| 17 | 28.557 | 1.00 | 1.96300 | 24.1 |
| 18 | 17.548 | 7.23 | 1.71300 | 53.9 |
| 19 | −60.601 | 2.89 | | |
| 20 | 37.284 | 4.55 | 1.98612 | 16.5 |
| 21 | −98.995 | (variable) | | |
| 22 | −72.090 | 1.30 | 1.69895 | 30.1 |
| 23 | 79.649 | (variable) | | |
| 24* | −77.183 | 1.70 | 1.88202 | 37.2 |
| 25* | 86.812 | 0.15 | | |
| 26 | 36.340 | 7.00 | 1.49700 | 81.5 |
| 27 | −138.658 | 12.23 | | |
| 28 | ∞ | 1.00 | 1.51633 | 64.1 |
| 29 | ∞ | 1.20 | | |
| Image Plane | ∞ | | | |

Aspherical Surface Data

Fifth Surface

K = 0.00000e+000   A4 = 4.85327e−006   A6 = −8.52073e−008
A8 = 2.83672e−010   A10 = −4.82069e−013

Sixth Surface

K = 0.00000e+000   A4 = −2.49473e−005   A6 = −1.68237e−007
A8 = 3.81613e−010   A10 = −1.10838e−012

Twenty-fourth Surface

K = 0.00000e+000   A4 = −4.59053e−005   A6 = −5.93749e−008
A8 = −4.47509e−010

Twenty-fifth Surface

K = 0.00000e+000   A4 = 1.28334e−005   A6 = 3.65924e−008
A8 = −1.48455e−010

| | |
|---|---|
| Focal Length | 18.54 |
| F-number | 1.85 |
| Half Angle of View (degrees) | 49.41 |
| Image Height | 21.64 |
| Total Lens Length | 107.66 |
| BF | 14.09 |

| | Infinite | Close |
|---|---|---|
| d8 | 6.69 | 4.59 |
| d10 | 1.80 | 3.90 |
| d21 | 5.32 | 4.85 |
| d23 | 3.80 | 4.26 |

Lens Unit Data

| Unit | Starting Surface | Focal Length |
|---|---|---|
| 1 | 1 | −62.77 |
| 2 | 9 | −38.81 |
| 3 | 11 | 24.03 |
| 4 | 22 | −53.95 |
| 5 | 24 | −245.93 |

Numerical Example 2

Unit mm
Surface Data

| Surface Number | r | d | nd | vd |
|---|---|---|---|---|
| 1 | 40.302 | 2.30 | 1.72916 | 54.7 |
| 2 | 18.837 | 9.46 | | |
| 3* | 192.069 | 2.00 | 1.58313 | 59.4 |
| 4* | 21.648 | 5.37 | | |
| 5 | 32.260 | 4.74 | 2.00330 | 28.3 |
| 6 | 181.053 | (variable) | | |
| 7 | −27.832 | 1.15 | 1.57501 | 41.5 |
| 8 | 81.052 | (variable) | | |
| 9 | 49.059 | 4.46 | 1.95375 | 32.3 |

-continued

| Unit mm Surface Data | | | | |
|---|---|---|---|---|
| 10 | −59.546 | 4.95 | | |
| 11 (stop) | ∞ | 1.30 | | |
| 12 | 44.003 | 6.61 | 1.49700 | 81.5 |
| 13 | −21.435 | 1.20 | 2.00272 | 19.3 |
| 14 | −625.448 | 6.95 | | |
| 15 | 26.657 | 5.64 | 1.55032 | 75.5 |
| 16 | −84.498 | 3.44 | | |
| 17 | 33.612 | 3.19 | 1.95906 | 17.5 |
| 18 | 86.792 | (variable) | | |
| 19 | −239.189 | 1.30 | 1.59551 | 39.2 |
| 20 | 43.753 | (variable) | | |
| 21* | −148.322 | 1.70 | 1.88202 | 37.2 |
| 22* | 151.190 | 0.20 | | |
| 23 | 31.790 | 4.33 | 1.49700 | 81.5 |
| 24 | 68.006 | 14.04 | | |
| 25 | ∞ | 1.00 | 1.51633 | 64.1 |
| 26 | ∞ | 1.20 | | |
| Image Plane | ∞ | | | |

Aspherical Surface Data

Third Surface

K = 0.00000e+000  A4 = 3.07061e−006  A6 = −3.89090e−008
A8 = 1.23138e−010  A10 = −1.78838e−013

Fourth Surface

K = 0.00000e+000  A4 = −1.21348e−005  A6 = −8.46786e−008
A8 = 1.65727e−010  A10 = −4.40418e−013

Twenty-first Surface

K = 0.00000e+000  A4 = −9.91373e−005  A6 = 3.85534e−007
A8 = −1.00779e−009

Twenty-second Surface

K = 0.00000e+000  A4 = −5.18193e−005  A6 = 4.65235e−007
A8 = −8.75909e−010

| | | |
|---|---|---|
| Focal Length | | 23.83 |
| F-number | | 1.85 |
| Half Angle of View (degrees) | | 42.24 |
| Image Height | | 21.64 |
| Total Lens Length | | 104.66 |
| BF | | 15.90 |

| | Infinite | Close |
|---|---|---|
| d6 | 8.36 | 5.49 |
| d8 | 1.80 | 4.67 |
| d18 | 3.67 | 2.50 |
| d20 | 4.63 | 5.80 |

| Lens Unit Data | | |
|---|---|---|
| Unit | Starting Surface | Focal Length |
| 1 | 1 | −89.02 |
| 2 | 7 | −35.89 |
| 3 | 9 | 24.90 |
| 4 | 19 | −62.00 |
| 5 | 21 | −299.54 |

Numerical Example 3

| Unit mm Surface Data | | | | |
|---|---|---|---|---|
| Surface Number | r | d | nd | vd |
| 1 | 43.294 | 2.00 | 1.98612 | 16.5 |
| 2 | 20.659 | 8.62 | | |
| 3* | 124.059 | 2.30 | 1.58313 | 59.4 |
| 4* | 34.294 | 9.42 | | |
| 5 | 37.686 | 4.60 | 2.00272 | 19.3 |

-continued

Unit mm
Surface Data

| | | | | |
|---|---|---|---|---|
| 6 | 3213.278 | (variable) | | |
| 7 | −35.250 | 1.10 | 1.65412 | 39.7 |
| 8 | 41.565 | (variable) | | |
| 9 | 38.751 | 5.12 | 1.95375 | 32.3 |
| 10 | −54.359 | 1.00 | | |
| 11 (stop) | ∞ | 1.50 | | |
| 12 | 40.904 | 6.76 | 1.61800 | 63.3 |
| 13 | −20.902 | 1.00 | 1.80810 | 22.8 |
| 14 | 120.048 | 2.87 | | |
| 15 | −27.052 | 0.85 | 1.53172 | 48.8 |
| 16 | 15.508 | 6.84 | 1.49700 | 81.5 |
| 17 | −71.726 | 0.50 | | |
| 18 | 28.109 | 6.51 | 1.72916 | 54.7 |
| 19 | −53.978 | (variable) | | |
| 20 | −98.870 | 1.20 | 1.75211 | 25.0 |
| 21 | 221.536 | (variable) | | |
| 22* | −149.243 | 1.70 | 1.88202 | 37.2 |
| 23* | 84.715 | 0.20 | | |
| 24 | 34.379 | 5.14 | 1.49700 | 81.5 |
| 25 | 147.518 | 13.05 | | |
| 26 | ∞ | 1.00 | 1.51633 | 64.1 |
| 27 | ∞ | 1.20 | | |
| Image Plane | ∞ | | | |

Aspherical Surface Data

Third Surface

K = 0.00000e+000   A4 = −2.25856e−006   A6 = −1.67012e−008
Fourth Surface

K = 0.00000e+000   A4 = −1.02450e−005   A6 = −3.07790e−008
A8 = −2.75699e−011   A10 = 5.89530e−014
Twenty-second Surface K = 0.00000e+000   A4 = −1.09480e−004   A6 = 4.43415e−007
A8 = −9.60874e−010
Twenty-third Surface K = 0.00000e+000   A4 = −6.38050e−005   A6 = 5.14863e−007
A8 = −9.66883e−010

| | |
|---|---|
| Focal Length | 24.65 |
| F-number | 1.85 |
| Half Angle Of View (degrees) | 41.27 |
| Image Height | 21.64 |
| Total Lens Length | 102.66 |
| BF | 14.91 |

| | Infinite | Close |
|---|---|---|
| d6 | 7.95 | 4.31 |
| d8 | 1.80 | 5.44 |
| d19 | 5.32 | 1.50 |
| d21 | 3.45 | 7.26 |

Lens Unit Data

| Unit | Starting Surface | Focal Length |
|---|---|---|
| 1 | 1 | 390.03 |
| 2 | 7 | −29.00 |
| 3 | 9 | 22.57 |
| 4 | 20 | −90.75 |
| 5 | 22 | −191.75 |

Numerical Example 4

| Unit mm Surface Data | | | | |
|---|---|---|---|---|
| Surface Number | r | d | nd | vd |
| 1 | 71.082 | 3.67 | 1.96300 | 24.1 |
| 2 | 114.339 | 0.25 | | |
| 3 | 78.465 | 2.20 | 1.91082 | 35.3 |
| 4 | 20.152 | 11.46 | | |
| 5* | −667.984 | 2.00 | 1.49710 | 81.6 |
| 6* | 22.069 | 4.48 | | |
| 7 | 41.136 | 5.68 | 1.96300 | 24.1 |
| 8 | −369.876 | (variable) | | |
| 9 | −27.196 | 1.15 | 1.90366 | 31.3 |
| 10 | −96.314 | (variable) | | |
| 11 | 89.370 | 5.12 | 2.00069 | 25.5 |
| 12 | −60.812 | 6.29 | | |
| 13 (stop) | ∞ | 0.81 | | |
| 14 | 66.463 | 8.86 | 1.49700 | 81.5 |
| 15 | −25.422 | 1.10 | 1.86966 | 20.0 |
| 16 | 86.939 | 0.30 | | |
| 17 | 32.356 | 1.30 | 2.00272 | 19.3 |
| 18 | 20.596 | 9.45 | 1.76802 | 49.2 |
| 19* | −195.625 | 5.46 | | |
| 20 | 41.001 | 6.36 | 1.98612 | 16.5 |
| 21 | −249.338 | (variable) | | |
| 22 | 57.264 | 5.49 | 1.49700 | 81.5 |
| 23 | −84.644 | 0.20 | | |
| 24 | −115.460 | 1.30 | 1.74000 | 28.3 |
| 25 | 38.290 | (variable) | | |
| 26* | −57.420 | 1.50 | 1.95150 | 29.8 |
| 27* | 160.409 | 0.30 | | |
| 28 | 71.732 | 5.79 | 1.81600 | 46.6 |
| 29 | −80.375 | 11.30 | | |
| 30 | ∞ | 1.00 | 1.51633 | 64.1 |
| 31 | ∞ | 1.20 | | |
| Image Plane | ∞ | | | |

Aspherical Surface Data

Fifth Surface

K = 0.00000e+000  A4 = −7.32632e−007  A6 = −9.91938e−009
A8 = 4.49119e−011  A10 = −7.81269e−014
Sixth Surface K = 0.00000e+000  A4 = −2.47848e−005  A6 = −3.94834e−008
A8 = 7.90588e−011  A10 = −2.92105e−013
Nineteenth Surface K = 0.00000e+000  A4 = 7.76814e−006  A6 = −1.07177e−009
A8 = −2.42865e−012  A10 = −4.34540e−015
Twenty-sixth Surface K = 0.00000e+000  A4 = −3.12808e−005  A6 = −3.54254e−008
A8 = −2.51064e−010
Twenty-seventh Surface K = 0.00000e+000  A4 = 2.47568e−006

| | |
|---|---|
| Focal Length | 20.48 |
| F-number | 1.44 |
| Half Angle of View (degrees) | 46.56 |
| Image Height | 21.64 |
| Total Lens Length | 124.66 |
| BF | 13.16 |

| | Infinite | Close |
|---|---|---|
| d8 | 9.33 | 6.78 |
| d10 | 1.60 | 4.15 |
| d21 | 2.92 | 1.99 |
| d25 | 7.14 | 8.07 |

-continued

| Unit mm | | |
|---|---|---|
| Surface Data | | |

Lens Unit Data

| Unit | Starting Surface | Focal Length |
|---|---|---|
| 1 | 1 | −61.87 |
| 2 | 9 | −42.27 |
| 3 | 11 | 27.12 |
| 4 | 22 | −96.53 |
| 5 | 26 | −3644.28 |

Numerical Example 5

| Unit mm | | | | |
|---|---|---|---|---|
| Surface Data | | | | |
| Surface Number | r | d | nd | vd |
| 1 | 60.455 | 3.12 | 2.00069 | 25.5 |
| 2 | 83.364 | 0.20 | | |
| 3 | 52.627 | 2.30 | 1.88300 | 40.8 |
| 4 | 18.520 | 9.82 | | |
| 5* | 380.179 | 2.00 | 1.58313 | 59.4 |
| 6* | 19.986 | 4.17 | | |
| 7 | 31.813 | 5.06 | 2.00069 | 25.5 |
| 8 | 352.505 | (variable) | | |
| 9 | −26.377 | 1.15 | 1.59270 | 35.3 |
| 10 | 114.847 | (variable) | | |
| 11 | 52.014 | 4.14 | 1.95375 | 32.3 |
| 12 | −54.889 | 5.59 | | |
| 13 (stop) | ∞ | 1.00 | | |
| 14 | 40.351 | 6.53 | 1.49700 | 81.5 |
| 15 | −20.264 | 1.20 | 2.00272 | 19.3 |
| 16 | −293.490 | 6.78 | | |
| 17 | 26.201 | 5.79 | 1.55032 | 75.5 |
| 18 | −68.817 | 2.81 | | |
| 19 | 33.568 | 3.23 | 1.98612 | 16.5 |
| 20 | 97.502 | (variable) | | |
| 21 | −1614.174 | 1.30 | 1.64769 | 33.8 |
| 22 | 38.517 | (variable) | | |
| 23* | −92.931 | 1.70 | 1.88202 | 37.2 |
| 24* | 124.280 | 0.15 | | |
| 25 | 33.861 | 5.36 | 1.49700 | 81.5 |
| 26 | 178.767 | 13.02 | | |
| 27 | ∞ | 1.00 | 1.51633 | 64.1 |
| 28 | ∞ | 1.20 | | |
| Image Plane | ∞ | | | |

Aspherical Surface Data

Fifth Surface

K = 0.00000e+000    A4 = −2.97503e−006    A6 = −8.53634e−009
A8 = 2.86069e−011   A10 = −4.04056e−014
Sixth Surface K = 0.00000e+000    A4 = −2.33351e−005    A6 = −6.00018e−008
A8 = 7.47792e−011   A10 = −3.86825e−013
Twenty-third Surface K = 0.00000e+000    A4 = −8.94876e−005    A6 = 3.16064e−007
A8 = −1.13913e−009
Twenty-fourth Surface K = 0.00000e+000    A4 = −3.48190e−005    A6 = 4.08970e−007
A8 = −8.98660e−010

| | |
|---|---|
| Focal Length | 21.36 |
| F-number | 1.85 |
| Half Angle of View (degrees) | 45.37 |
| Image Height | 21.64 |
| Total Lens Length | 105.66 |
| BF | 14.88 |

-continued

| Unit mm Surface Data | | |
|---|---|---|
| | Infinite | Close |
| d8 | 7.81 | 5.47 |
| d10 | 1.80 | 4.15 |
| d20 | 2.90 | 2.09 |
| d22 | 4.86 | 5.67 |

| Lens Unit | Unit Data Starting Surface | Focal Length |
|---|---|---|
| 1 | 1 | −62.24 |
| 2 | 9 | −36.08 |
| 3 | 11 | 24.13 |
| 4 | 21 | −58.06 |
| 5 | 23 | −215.61 |

Numerical Example 6

| Unit mm Surface Data | | | | |
|---|---|---|---|---|
| Surface Number | r | d | nd | vd |
| 1 | 45.625 | 2.30 | 1.88300 | 40.8 |
| 2 | 19.973 | 9.65 | | |
| 3* | 97.209 | 2.00 | 1.58313 | 59.4 |
| 4* | 21.326 | 7.63 | | |
| 5 | 36.738 | 5.31 | 2.00069 | 25.5 |
| 6 | 480.286 | (variable) | | |
| 7 | −30.454 | 1.15 | 1.59270 | 35.3 |
| 8 | 69.634 | (variable) | | |
| 9 | 47.020 | 4.26 | 2.00100 | 29.1 |
| 10 | −71.406 | 2.84 | | |
| 11 (stop) | ∞ | 2.28 | | |
| 12 | 37.424 | 6.70 | 1.49700 | 81.5 |
| 13 | −22.021 | 1.20 | 2.00272 | 19.3 |
| 14 | 233.420 | 4.87 | | |
| 15 | 26.449 | 5.54 | 1.49700 | 81.5 |
| 16 | −61.434 | 3.13 | | |
| 17 | 33.156 | 3.83 | 1.95906 | 17.5 |
| 18 | 352.565 | (variable) | | |
| 19 | −62.492 | 1.10 | 1.86966 | 20.0 |
| 20 | 74.819 | 2.81 | | |
| 21* | −64.366 | 1.60 | 1.88202 | 37.2 |
| 22* | −348.609 | (variable) | | |
| 23 | 57.982 | 3.37 | 1.88300 | 40.8 |
| 24 | 209.001 | 12.02 | | |
| 25 | ∞ | 1.00 | 1.51633 | 64.1 |
| 26 | ∞ | 1.20 | | |
| Image Plane | ∞ | | | |

Aspherical Surface Data

Third Surface

K = 0.00000e+000    A4 = 3.39713e−006    A6 = −6.18930e−008
A8 = 1.64082e−010   A10 = −2.13584e−013

Fourth Surface

K = 0.00000e+000    A4 = −1.35737e−005   A6 = −1.22108e−007
A8 = 2.45038e−010   A10 = −4.58318e−013

Twenty-first Surface

K = 0.00000e+000    A4 = −1.81608e−005   A6 = −1.52507e−007
A8 = −1.75893e−010

Twenty-second Surface

K = 0.00000e+000    A4 = 3.57569e−005    A6 = −6.07934e−008

| | |
|---|---|
| Focal Length | 21.36 |
| F-number | 1.85 |
| Half Angle Of View (degrees) | 45.37 |
| Image Height | 21.64 |

| Unit mm Surface Data | | |
|---|---|---|
| Total Lens Length | | 104.66 |
| BF | | 13.88 |
| | Infinite | Close |
| d6 | 9.06 | 6.79 |
| d8 | 1.80 | 4.06 |
| d18 | 4.89 | 4.55 |
| d22 | 3.47 | 3.81 |

| Lens Unit Data | | |
|---|---|---|
| Unit | Starting Surface | Focal Length |
| 1 | 1 | −103.32 |
| 2 | 7 | −35.60 |
| 3 | 9 | 22.92 |
| 4 | 19 | −26.58 |
| 5 | 23 | 89.94 |

Numerical Example 7

| Unit mm Surface Data | | | | |
|---|---|---|---|---|
| Surface Number | r | d | nd | vd |
| 1 | 54.177 | 2.30 | 1.81600 | 46.6 |
| 2 | 20.044 | 9.30 | | |
| 3* | 87.014 | 2.00 | 1.58313 | 59.4 |
| 4* | 21.341 | 7.51 | | |
| 5 | 34.914 | 5.76 | 2.00330 | 28.3 |
| 6 | 471.293 | (variable) | | |
| 7 | −35.278 | 1.15 | 1.59270 | 35.3 |
| 8 | 51.765 | (variable) | | |
| 9 | 43.869 | 4.14 | 2.00100 | 29.1 |
| 10 | −88.899 | 3.11 | | |
| 11 (stop) | ∞ | 3.20 | | |
| 12 | 36.625 | 7.77 | 1.49700 | 81.5 |
| 13 | −20.631 | 1.20 | 2.00272 | 19.3 |
| 14 | 178.185 | 2.95 | | |
| 15 | 28.865 | 5.10 | 1.55032 | 75.5 |
| 16 | −55.410 | 3.50 | | |
| 17 | 36.000 | 3.79 | 1.95906 | 17.5 |
| 18 | 1773.017 | (variable) | | |
| 19 | −59.537 | 1.10 | 1.72825 | 28.5 |
| 20 | 63.303 | 2.93 | | |
| 21* | −91.851 | 1.60 | 1.88202 | 37.2 |
| 22* | −31321.373 | 2.97 | | |
| 23 | 57.189 | 3.44 | 1.88300 | 40.8 |
| 24 | 218.987 | (variable) | | |
| 25 | ∞ | 1.00 | 1.51633 | 64.1 |
| 26 | ∞ | 1.20 | | |
| Image Plane | ∞ | | | |

Aspherical Surface Data

Third Surface

K = 0.00000e+000  A4 = 5.14973e−006  A6 = −5.89074e−008
A8 = 1.49456e−010  A10 = −1.92361e−013

Fourth Surface

K = 0.00000e+000  A4 = −1.05846e−005  A6 = −1.12184e−007
A8 = 2.13747e−010  A10 = −4.23379e−013

Twenty-first Surface

K = 0.00000e+000  A4 = −3.12505e−005  A6 = −1.05043e−007
A8 = − 3.70540e−010

Twenty-second Surface

K = 0.00000e+000  A4 = 2.03266e−005  A6 = −2.97689e−008

| Unit mm Surface Data | |
|---|---|
| Focal Length | 21.36 |
| F-number | 1.85 |
| Half Angle of View (degrees) | 45.37 |
| Image Height | 21.64 |
| Total Lens Length | 104.66 |
| BF | 13.82 |

| | Infinite | Close |
|---|---|---|
| d6 | 9.20 | 6.82 |
| d8 | 1.80 | 4.18 |
| d18 | 5.03 | 4.56 |
| d24 | 11.96 | 12.43 |

| Lens Unit Data Unit | Starting Surface | Focal Length |
|---|---|---|
| 1 | 1 | −132.01 |
| 2 | 7 | −35.22 |
| 3 | 9 | 23.17 |
| 4 | 19 | −48.84 |

Numerical Example 8

| Unit mm Surface Data | | | | |
|---|---|---|---|---|
| Surface Number | r | d | nd | vd |
| 1 | 105.741 | 3.21 | 1.87070 | 40.7 |
| 2 | −2050.338 | 0.20 | | |
| 3 | 106.436 | 1.90 | 1.48749 | 70.2 |
| 4 | 13.763 | 5.41 | | |
| 5* | 138.744 | 1.50 | 1.85135 | 40.1 |
| 6* | 53.747 | 0.30 | | |
| 7 | 21.941 | 2.13 | 1.98612 | 16.5 |
| 8 | 29.241 | (variable) | | |
| 9 | −64.761 | 1.10 | 1.86966 | 20.0 |
| 10 | 66.229 | (variable) | | |
| 11 | 127.401 | 5.20 | 1.69680 | 55.5 |
| 12 | −29.344 | 2.70 | | |
| 13 (stop) | ∞ | 4.74 | | |
| 14 | 97.587 | 6.16 | 1.49700 | 81.5 |
| 15 | −30.921 | 1.56 | | |
| 16 | 15981.928 | 6.96 | 1.49700 | 81.5 |
| 17 | −18.814 | 1.20 | 1.75520 | 27.5 |
| 18 | −44.372 | 0.30 | | |
| 19 | 116.623 | 3.87 | 2.00100 | 29.1 |
| 20 | −53.598 | (variable) | | |
| 21 | −112.174 | 1.20 | 1.51742 | 52.4 |
| 22 | 36.419 | (variable) | | |
| 23* | −54.964 | 1.70 | 1.87790 | 37.6 |
| 24* | 48.827 | 0.20 | | |
| 25 | 41.022 | 7.69 | 1.49700 | 81.5 |
| 26 | −65.868 | 10.30 | | |
| 27 | ∞ | 1.00 | 1.51633 | 64.1 |
| 28 | ∞ | 1.20 | | |
| Image Plane | ∞ | | | |

Aspherical Surface Data

Fifth Surface

K = 0.00000e+000    A4 = 1.32588e−004    A6 = −8.01346e−007
A8 = 1.48857e−009   A10 = −4.19042e−012

Sixth Surface

K = 0.00000e+000    A4 = 1.56276e−004    A6 = −7.24432e−007
A8 = 6.99433e−010   A10 = −2.51975e−012

Twenty-third Surface

K = 0.00000e+000    A4 = −2.38553e−005   A6 = −3.97379e−008
A8 = −1.60202e−010

Unit mm
Surface Data

Twenty-fourth Surface

K = 0.00000e+000   A4 = 5.44593e−006   A6 = −2.70904e−008
A8 = 1.97181e−011

| | |
|---|---|
| Focal Length | 28.08 |
| F-number | 1.85 |
| Half Angle of View (degrees) | 37.61 |
| Image Height | 21.64 |
| Total Lens Length | 92.66 |
| BF | 12.16 |

| | Infinite | Close |
|---|---|---|
| d8 | 4.38 | 6.69 |
| d10 | 4.31 | 2.00 |
| d20 | 1.50 | 6.55 |
| d22 | 11.07 | 6.02 |

Lens Unit Data

| Unit | Starting Surface | Focal Length |
|---|---|---|
| 1 | 1 | −53.29 |
| 2 | 9 | −37.50 |
| 3 | 11 | 19.62 |
| 4 | 21 | −52.99 |
| 5 | 23 | −75.27 |

Various values in the first to eighth exemplary embodiments are shown in Table 1 below.

TABLE 1

| | | First to Eighth Exemplary Embodiments | | | | | | | |
|---|---|---|---|---|---|---|---|---|---|
| | | First | Second | Third | Fourth | Fifth | Sixth | Seventh | Eighth |
| | F | 18.540 | 23.828 | 24.652 | 20.485 | 21.360 | 21.360 | 21.360 | 28.085 |
| | ω (°) | 49.409 | 42.236 | 41.267 | 46.565 | 45.365 | 45.368 | 45.368 | 37.604 |
| | f1 | −62.765 | −89.022 | 390.034 | −61.874 | −62.235 | −103.317 | −132.006 | −53.293 |
| | f2 | 24.032 | 24.897 | 22.574 | 27.121 | 24.129 | 22.923 | 23.170 | 19.616 |
| | fF | −15.929 | −18.431 | −19.686 | −17.346 | −16.490 | −17.277 | −17.946 | −20.002 |
| | fF1 | −38.812 | −35.892 | −28.996 | −42.271 | −36.082 | −35.596 | −35.224 | −37.504 |
| | fF2 | −53.949 | −62.004 | −90.746 | −96.528 | −58.064 | −26.584 | −48.843 | −52.989 |
| | Sk | 14.085 | 15.904 | 14.911 | 13.159 | 14.880 | 13.880 | 14.289 | 12.161 |
| | D | 35.781 | 33.382 | 35.997 | 40.210 | 35.638 | 37.088 | 37.212 | 20.134 |
| | Dair_max | 10.037 | 9.457 | 9.417 | 11.462 | 9.824 | 9.649 | 9.301 | 11.069 |
| | DSP1 | 10.004 | 11.201 | 7.922 | 13.010 | 11.531 | 8.905 | 9.046 | 12.214 |
| | DSP2 | 33.839 | 32.011 | 32.145 | 36.558 | 30.241 | 32.438 | 32.540 | 26.294 |
| | L | 93.574 | 88.755 | 87.748 | 111.500 | 90.779 | 90.779 | 90.370 | 80.499 |
| | MLF1 | −2.103 | −2.873 | −3.641 | −2.545 | −2.347 | −2.263 | −2.380 | 2.309 |
| | MLF2 | −0.463 | −1.169 | −3.818 | −0.927 | −0.814 | −0.340 | −0.469 | 5.051 |
| | R1 | −29.653 | −27.832 | −35.250 | −27.196 | −26.377 | −30.454 | −35.278 | −64.761 |
| | R2 | 104.068 | 81.052 | 41.565 | −96.314 | 114.847 | 69.634 | 51.765 | 66.229 |
| | RLF1 | −29.653 | −27.832 | −35.250 | −27.196 | −26.377 | −30.454 | −35.278 | −64.761 |
| Conditional Expression (1) | \|fF1\|/\|f1\| | 0.618 | 0.403 | 0.074 | 0.683 | 0.580 | 0.345 | 0.267 | 0.704 |
| Conditional Expression (2) | sk/fF1 | −0.363 | −0.443 | −0.514 | −0.311 | −0.412 | −0.390 | −0.406 | −0.324 |
| Conditional Expression (3) | fF1/fF2 | 0.719 | 0.579 | 0.320 | 0.438 | 0.621 | 1.339 | 0.721 | 0.708 |
| Conditional Expression (4) | Dair_max/L | 0.107 | 0.107 | 0.107 | 0.103 | 0.108 | 0.106 | 0.103 | 0.138 |
| Conditional Expression (5) | (R1 + R2)/(R1 − R2) | −0.556 | −0.489 | −0.082 | −1.787 | −0.626 | −0.391 | −0.189 | −0.011 |
| Conditional Expression (6) | DSP1/DSP2 | 0.296 | 0.350 | 0.246 | 0.356 | 0.381 | 0.275 | 0.278 | 0.465 |

TABLE 1-continued

| | | First to Eighth Exemplary Embodiments | | | | | | | |
|---|---|---|---|---|---|---|---|---|---|
| | | First | Second | Third | Fourth | Fifth | Sixth | Seventh | Eighth |
| Conditional Expression (7) | sk/(f × tanω) | 0.651 | 0.735 | 0.689 | 0.608 | 0.688 | 0.642 | 0.660 | 0.562 |
| Conditional Expression (8) | |MLF1|/|MLF2| | 4.541 | 2.457 | 0.954 | 2.745 | 2.883 | 6.653 | 5.073 | 0.457 |
| Conditional Expression (9) | fF/f | −0.859 | −0.774 | −0.799 | −0.847 | −0.772 | −0.809 | −0.840 | −0.712 |
| Conditional Expression (10) | fF/D | −0.445 | −0.552 | −0.547 | −0.431 | −0.463 | −0.466 | −0.482 | −0.993 |
| Conditional Expression (11) | Np | 24.11 | 28.27 | 19.32 | 24.11 | 25.46 | 25.46 | 28.27 | 16.48 |
| Conditional Expression (12) | f2/f | 1.296 | 1.045 | 0.916 | 1.324 | 1.130 | 1.073 | 1.085 | 0.698 |
| Conditional Expression (13) | RLF1/f | −1.599 | −1.168 | −1.430 | −1.328 | −1.235 | −1.426 | −1.652 | −2.306 |

[Image Capturing Apparatus]

Figure 17:
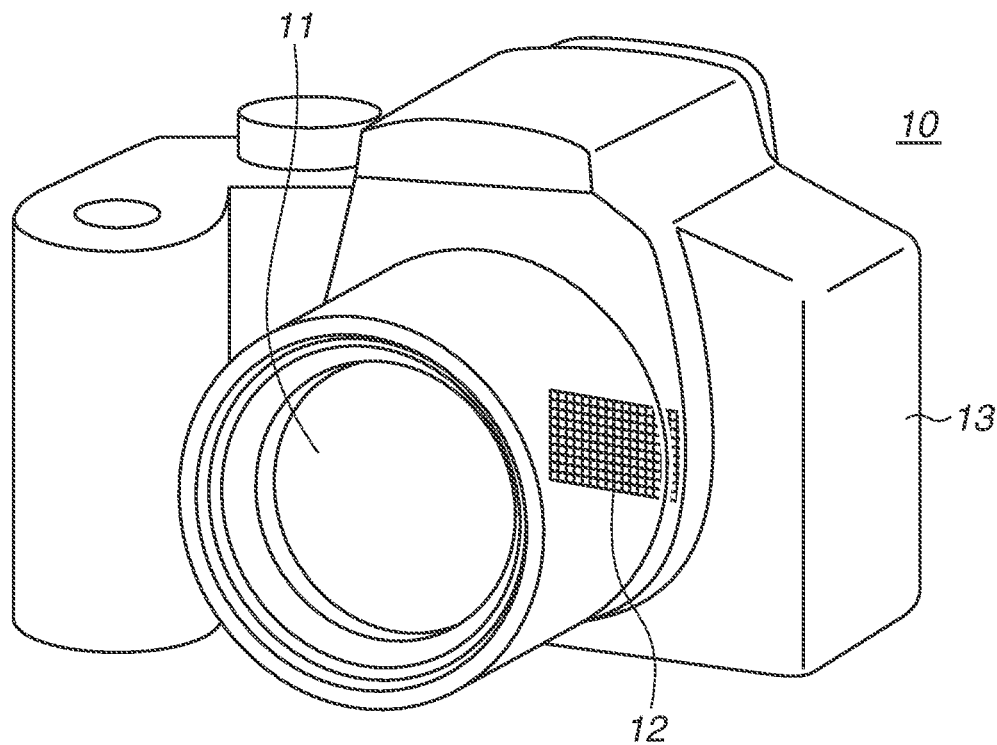
FIG. 17 is a schematic diagram illustrating an image capturing apparatus.

Next, an image capturing apparatus according to an exemplary embodiment of the disclosure will be described below. FIG. 17 is a schematic diagram illustrating an image capturing apparatus (digital still camera) 10 according to the present exemplary embodiment. The image capturing apparatus 10 includes a camera body 13, an optical system 11, and a light receiving element (image sensor) 12. The optical system 11 is similar to an optical system according to any one of the first to eighth exemplary embodiments. The light receiving element 12 photoelectrically converts an image formed by the optical system 11.

The image capturing apparatus 10 according to the present exemplary embodiment acquires high-quality images formed by the optical system 11 having high optical performance and smaller aberration variations in focusing.

An image sensor such as a CCD sensor or a CMOS sensor can be used as the light receiving element 12. In this case, the quality of an output image is increased by electrically correcting various aberrations such as a distortion aberration and a chromatic aberration in an image acquired by the light receiving element 12.

The optical system L0 according to any one of the above-described exemplary embodiments is not limited to the digital still camera illustrated in FIG. 17 but is also applicable to various optical devices such as silver-halide film cameras, video cameras, and telescopes. Further, either one of a lens-integrated camera and an interchangeable-lens camera can be employed.

[Lens Apparatus]

Figure 18:
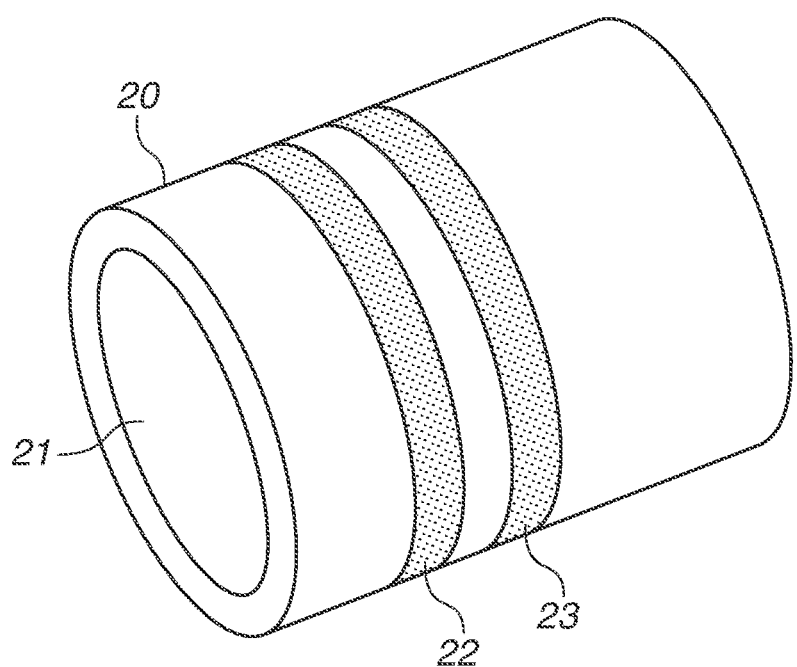
FIG. 18 is a schematic diagram illustrating a lens apparatus.

FIG. 18 is a schematic diagram illustrating an external view of a lens apparatus according to the present exemplary embodiment. The lens apparatus illustrated in FIG. 18 is an exchangeable lens that is to be removably attached to a camera body (not illustrated).

A lens apparatus 20 includes an imaging optical system 21 similar to that described in any one of the first to eighth exemplary embodiments. The lens apparatus 20 includes a focus operation unit 22 and an operation unit 23 for changing an image capturing mode.

A user operation on the focus operation unit 22 mechanically or electrically changes the arrangement of the first focusing unit LF1 and the second focusing unit LF2 of the image capturing optical system 21, so that a focal point position changes.

Alternatively, the arrangement of the lens units of the image capturing optical system 21 can be changed by a user operation on the operation unit 23 for a purpose other than focusing. For example, the arrangement of the lens units of the image capturing optical system 21 is mechanically or electrically changed by operating the operation unit 23 to change aberrations in the image capturing optical system 21. In this case, the focus position remains substantially unchanged.

While various exemplary embodiments and examples of the disclosure have been described above, the disclosure is not limited to the exemplary embodiments and examples, and various combinations, modifications, and changes are possible within the spirit of the invention.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-099057, filed Jun. 8, 2020, which is hereby incorporated by reference herein in its entirety.

What is claimed is:

1. An optical system comprising a front lens unit, a first focusing unit having a negative refractive power, and a second focusing unit having a negative refractive power in this order from an object side to an image side,
wherein the optical system is a fixed local length optical system,
wherein, when a focus is shifted from an object at infinity to an object at a short distance, the first focusing unit and the second focusing unit move to change a distance between the first focusing unit and the second focusing unit on an optical axis, and
wherein the following inequalities are satisfied:

$0.00 < |fF1|/|f1| < 0.77$, $-0.76 < sk/fF1 < 0.00$, and $0.10 < fF1/fF2 < 1.90$, where fF1 is a focal length of the first focusing unit, fF2 is a focal length of the second focusing unit, f1 is a focal length of the front lens unit, and sk is a back focus of the optical system.

2. The optical system according to claim 1, wherein the following inequality is satisfied:

$$0.05 < D_{air\_max}/L < 0.25,$$

where Dair_max is a maximum air distance in an air distance formed between a lens surface closest to an object side and a lens surface closest to an image side in the optical system on the optical axis, and L is a distance from the lens surface closest to the object side to the lens surface closest to the image side in the optical system on the optical axis.

3. The optical system according to claim 1, wherein the first focusing unit includes a negative lens, and wherein the following inequality is satisfied:

$$-2.50 < (R1+R2)/(R1-R2) < 0.50,$$

where R1 is a radius of curvature of an object-side lens surface of the negative lens, and R2 is a radius of curvature of an image-side lens surface of the negative lens.

4. The optical system according to claim 1, wherein the first focusing unit includes of a single lens element having a negative refractive power.

5. The optical system according to claim 1, further comprising an aperture stop between the first focusing unit and the second focusing unit, wherein the following inequality is satisfied:

$$0.15 < DSP1/DSP2 < 0.70,$$

where DSP1 is a distance from a lens surface closest to the image side in the first focusing unit to the aperture stop on the optical axis, and DSP2 is a distance from the aperture stop to a lens surface closest to the object side in the second focusing unit on the optical axis.

6. The optical system according to claim 1, wherein the following inequality is satisfied:

$$0.35 < sk/(f \times \tan\omega) < 0.90,$$

where ω is a half angle of view of the optical system, and f is a focal length of the optical system.

7. The optical system according to claim 1, wherein the following inequality is satisfied:

$$0.20 < |MLF1|/|MLF2| < 7.00,$$

where MLF1 is an amount of movement of the first focusing unit with respect to an image plane on the optical axis when a focus is shifted from an object at infinity to an object at a short distance, and MLF2 is an amount of movement of the second focusing unit with respect to the image plane on the optical axis when the focus is shifted from the object at infinity to the object at the short distance.

8. The optical system according to claim 1, wherein the following inequality is satisfied:

$$-1.20 < fF/f < -0.40,$$

where fF is a combined focal length of the front lens unit and the first focusing unit, and f is a focal length of the optical system.

9. The optical system according to claim 1, wherein the following inequality is satisfied:

$$-1.30 < fF/D < -0.20,$$

where fF is a combined focal length of the front lens unit and the first focusing unit, and D is a distance between a lens surface closest to the object side in the front lens unit and a lens surface closest to the image side in the first focusing unit on the optical axis.

10. The optical system according to claim 1, wherein the front lens unit includes a positive lens, and wherein the following inequality is satisfied:

$$15.00 < vp < 35.00,$$

where vp is an Abbe number of the positive lens.

11. The optical system according to claim 1, further comprising an intermediate unit that is a lens unit between the first focusing unit and the second focusing unit, wherein the intermediate unit has a positive refractive power.

12. The optical system according to claim 11, wherein the intermediate unit includes an aperture stop.

13. The optical system according to claim 11, wherein the intermediate unit includes a compound lens consisting of a positive lens and a negative lens.

14. The optical system according to claim 11, wherein the following inequality is satisfied:

$$0.45 < f2/f < 1.60,$$

where f2 is a focal length of the intermediate unit, and f is a focal length of the optical system.

15. The optical system according to claim 1, wherein the following inequality is satisfied:

$$-3.05 < RLF1/f < -0.60,$$

where RLF1 is a radius of curvature of a lens surface closest to the object side in the first focusing unit, and f is a focal length of the optical system.

16. The optical system according to claim 1, wherein the front lens unit includes at least two negative lenses.

17. The optical system according to claim 1, wherein a positive lens is arranged at a position closest to the image side in the optical system.

18. An apparatus comprising an optical system and a sensor configured to receive an image formed by the optical system,
wherein the optical system is a fixed focal length optical system comprising a front lens unit, a first focusing unit having a negative refractive power, and a second focusing unit having a negative refractive power in this order from an object side to an image side,
wherein, when a focus is shifted from an object at infinity to an object at a short distance, the first focusing unit and the second focusing unit move to change a distance between the first focusing unit and the second focusing unit on an optical axis, and
wherein the following inequalities are satisfied:

$$0.00 < |fF1|/|f1| < 0.77,$$

$$-0.76 < sk/fF1 < 0.00, \text{ and}$$

$$0.10 < fF1/fF2 < 1.90,$$

where fF1 is a focal length of the first focusing unit, fF2 is a focal length of the second focusing unit, f1 is a focal length of the front lens unit, and sk is a back focus of the optical system.

* * * * *